(12) United States Patent
Ahire et al.

(10) Patent No.: US 11,290,856 B2
(45) Date of Patent: Mar. 29, 2022

(54) ESTABLISHING CONNECTIONS IN TRANSPORTS

(71) Applicant: TOYOTA MOTOR NORTH AMERICA, INC., Plano, TX (US)

(72) Inventors: Sachin J. Ahire, Frisco, TX (US); Manoj Kalamkar, McKinney, TX (US); Christopher J. Risberg, Flower Mound, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/836,907

(22) Filed: Mar. 31, 2020

(65) Prior Publication Data

US 2021/0306823 A1  Sep. 30, 2021

(51) Int. Cl.

| | |
|---|---|
| *H04W 4/02* | (2018.01) |
| *H04W 4/40* | (2018.01) |
| *G06Q 10/10* | (2012.01) |
| *G06K 9/00* | (2022.01) |
| *H04L 67/306* | (2022.01) |
| *G06F 16/27* | (2019.01) |

(52) U.S. Cl.
CPC .............. *H04W 4/40* (2018.02); *G06F 16/27* (2019.01); *G06K 9/00288* (2013.01); *G06Q 10/1095* (2013.01); *H04L 67/306* (2013.01); *H04W 4/023* (2013.01)

(58) Field of Classification Search
CPC ................................ H04W 4/40; H04W 4/023
See application file for complete search history.

(56) References Cited

U.S. PATENT DOCUMENTS

| | | | |
|---|---|---|---|
| 6,926,374 B2 | 8/2005 | Dudeck et al. | |
| 7,110,570 B1 | 9/2006 | Berenz et al. | |
| 7,130,448 B2 | 10/2006 | Nagaoka et al. | |
| 7,202,776 B2 | 4/2007 | Breed | |
| 7,301,464 B2 * | 11/2007 | Coulter ................... | B60R 25/25 340/573.7 |
| 7,380,948 B2 | 6/2008 | Schofield et al. | |
| 7,671,764 B2 | 3/2010 | Uyeki et al. | |
| 7,720,580 B2 | 5/2010 | Higgins-Luthman | |
| 7,843,313 B2 | 11/2010 | Bazakos et al. | |
| 7,899,616 B2 * | 3/2011 | Breed ..................... | G08G 1/161 701/423 |
| 7,925,423 B2 | 4/2011 | Howarter et al. | |
| 7,961,094 B2 | 6/2011 | Breed | |

(Continued)

FOREIGN PATENT DOCUMENTS

| | | |
|---|---|---|
| CN | 101414407 A | 4/2009 |
| CN | 101281685 B | 8/2010 |

(Continued)

*Primary Examiner* — Tuan H Nguyen

(57) ABSTRACT

An example operation may include one or more of identifying, via a transport, at least one person in proximity to the transport, determining the at least one person matches one or more profile attributes of a profile of at least one transport occupant, sending a notification to a communication device in the transport to prompt the at least one transport occupant about the identified at least one person and the matched one or more profile attributes, and responsive to receiving a communication request from the communication device, transmitting a communication invite to a mobile device of the at least one person.

17 Claims, 25 Drawing Sheets

(56) References Cited

U.S. PATENT DOCUMENTS

| | | |
|---|---|---|
| 8,027,029 B2 | 9/2011 | Lu et al. |
| 8,284,041 B2 | 10/2012 | Cuddihy et al. |
| 8,396,252 B2 | 3/2013 | Dokor |
| 8,723,687 B2 | 5/2014 | Thomas |
| 8,761,998 B2 | 6/2014 | Chen et al. |
| 8,849,494 B1 | 9/2014 | Herbach et al. |
| 8,855,900 B2 | 10/2014 | Lection et al. |
| 9,332,261 B2 | 5/2016 | Yousefi et al. |
| 9,493,130 B2 | 11/2016 | Penilla et al. |
| 9,507,346 B1 | 11/2016 | Levinson et al. |
| 9,711,050 B2 | 7/2017 | Ansari |
| 9,714,037 B2 | 7/2017 | Deruyck et al. |
| 9,734,710 B2 | 8/2017 | Kang |
| 9,761,136 B2 | 9/2017 | Tonguz et al. |
| 9,771,070 B2 | 9/2017 | Zagorski et al. |
| 9,910,441 B2 | 3/2018 | Levinson et al. |
| 9,952,680 B2 | 4/2018 | Ricci |
| 9,964,414 B2 | 5/2018 | Slavin et al. |
| 9,994,229 B2 | 6/2018 | Ricci |
| 10,120,385 B2 | 11/2018 | Connor |
| 2006/0155427 A1 | 7/2006 | Yang |
| 2013/0162449 A1 | 6/2013 | Ginsberg |
| 2013/0204457 A1 | 8/2013 | King et al. |
| 2017/0010679 A1 | 1/2017 | Hillis et al. |
| 2017/0123428 A1 | 5/2017 | Levinson et al. |
| 2018/0210463 A1 | 7/2018 | Switkes et al. |
| 2018/0210464 A1 | 7/2018 | Switkes et al. |
| 2019/0279447 A1* | 9/2019 | Ricci .................. B60Q 9/00 |

FOREIGN PATENT DOCUMENTS

| | | |
|---|---|---|
| CN | 101475002 B | 2/2014 |
| CN | 104271420 B | 6/2017 |
| DE | 60106296 | 11/2004 |
| DE | 102010013232 | 6/2016 |
| EP | 1542194 A1 | 6/2005 |
| EP | 1271179 B1 | 10/2006 |
| EP | 2216225 A1 | 8/2010 |
| EP | 2228779 A2 | 9/2010 |
| ES | 2391556 | 11/2012 |
| JP | 4028135 B2 | 12/2007 |
| JP | 5016022 B2 | 9/2012 |
| JP | 6051162 B2 | 12/2016 |
| JP | 6126199 B2 | 5/2017 |
| JP | 6218200 B2 | 10/2017 |
| KR | 101210875 B1 | 12/2012 |
| KR | 101614677 B1 | 4/2016 |
| WO | 2012002645 A2 | 1/2012 |

* cited by examiner

700

ESTABLISHING CONNECTIONS IN TRANSPORTS

TECHNICAL FIELD

This application generally relates to automated controls, and more particularly, to automated controls for transports.

BACKGROUND

Vehicles or transports, such as cars, motorcycles, trucks, planes, trains, etc., generally provide transportation needs to occupants and/or goods in a variety of ways. Functions related to transports may be identified and utilized by various computing devices, such as a smartphone or a computer.

Transports may experience various conditions in areas populated with people, traffic, etc. Autonomous transports which are operated without drivers can encounter safety concerns, such as pedestrians in a roadway. Also, traffic surges may create slowdowns which can cause lost time and wasted resources. What is needed are solutions to overcome these problems and limitations.

SUMMARY

One example embodiment provides a method that includes one or more of identifying a plurality of transports operating on a roadway, determining a degree of transport traffic based on the plurality of identified transports, when the degree of transport traffic has exceeded a traffic level, assigning one or more of the plurality of identified transports as a roadway manage, controlling movement of the roadway manager, and generating a roadway indicator on the roadway manager to direct the plurality of identified transports.

Another example embodiment includes a system that includes a computing device, and a plurality of transports, and one of the plurality of transports or the computing device is configured to perform one or more of identify the plurality of transports on a roadway, determine a degree of transport traffic based on the plurality of identified transports, when the degree of transport traffic has exceeded a traffic level, assign one or more of the plurality of identified transports as a roadway manager, control movement of the roadway manager, and generate a roadway indicator on the roadway manager to direct the plurality of identified transports.

Still another example embodiment includes a non-transitory computer readable storage medium configured to store instructions that when executed cause a processor to perform one or more of identifying a plurality of transports operating on a roadway, determining a degree of transport traffic based on the plurality of identified transports, when the degree of transport traffic has exceeded a traffic level, assigning one or more of the plurality of identified transports as a roadway manager, controlling movement of the roadway manager, and generating a roadway indicator on the roadway manager to direct the plurality of identified transports.

Still yet another example embodiment provides a method that includes one or more of identifying a person as a roadway obstruction via a transport moving along the roadway, determining a first threat level of the person at a first time, via the transport, when the first threat level is above a threshold, indicating via the transport, to alert at least one of an occupant of the transport and the person, detecting a gesture, via the transport, performed by the person, wherein the gesture indicates the transport should proceed, responsive to detecting the gesture, determining a second threat level at a second time is below the threshold, and responsive to the second threat level being below the threshold, proceeding, by the transport, along the roadway.

Still yet a further example embodiment provides a system that includes a transport configured to perform one or more of identify a person as a roadway obstruction moving along a roadway, determine a first threat level of the person at a first time, when the first threat level is above a threshold, perform an alert indication to at least one of an occupant of the transport and the person, detect a gesture, performed by the person, wherein the gesture indicates the transport should proceed, responsive to detection of the gesture, determine a second threat level at a second time is below the threshold, and responsive to the second threat level being below the threshold, proceed along the roadway.

Still yet another example embodiment includes a non-transitory computer readable storage medium configured to store instructions that when executed cause a processor to perform one or more of identifying a person as a roadway obstruction via a transport moving along the roadway, determining a first threat level of the person at a first time, via the transport, when the first threat level is above a threshold, indicating via the transport, to alert at least one of an occupant of the transport and the person, detecting a gesture, via the transport, performed by the person, and the gesture indicates the transport should proceed, responsive to detecting the gesture, determining a second threat level at a second time is below the threshold, and responsive to the second threat level being below the threshold, proceeding, by the transport, along the roadway.

Still yet another example embodiment provides a method that includes one or more of identifying, via a transport, at least one person in proximity to the transport, determining the at least one person matches one or more profile attributes of a profile of at least one transport occupant, sending a notification to a communication device in the transport to prompt the at least one transport occupant about the identified at least one person and the matched one or more profile attributes, and responsive to receiving a communication request from the communication device, transmitting a communication invite to a mobile device of the at least one person.

Still yet another example embodiment includes a system that includes a transport, and a communication device, and the transport is configured to perform one or more of identify at least one person in proximity to the transport, determine the at least one person matches one or more profile attributes of a profile of at least one transport occupant, send a notification to the communication device in the transport to prompt the at least one transport occupant about the identified at least one person and the matched one or more profile attributes, and responsive to a communication request being received from the communication device, transmit a communication invite to a mobile device of the at least one person.

Still yet a further example embodiment includes a non-transitory computer readable storage medium configured to store instructions that when executed cause a processor to perform one or more of identifying, via a transport, at least one person in proximity to the transport, determining the at least one person matches one or more profile attributes of a profile of at least one transport occupant, sending a notification to a communication device in the transport to prompt the at least one transport occupant about the identified at least one person and the matched one or more profile attributes, and responsive to receiving a communication request from the communication device, transmitting a communication invite to a mobile device of the at least one person.

Yet a further example embodiment provides a method that includes one or more of identifying a plurality of transports operating on a roadway, identifying one or more gestures performed by one or more of a plurality of transport occupants located inside the transports, interpreting the one or more gestures as transport operation controls, determining one of the transports has a higher priority than at least one other of the plurality of transports, applying the one or more gestures associated with the higher priority transport to control movement of the plurality of transports on the roadway.

Still a further example embodiment includes a system that includes a computing device, and a plurality of transports, and the computing device is configured to perform one or more of identify the plurality of transports operating on a roadway, identify one or more gestures performed by one or more of a plurality of transport occupants located inside the transports, interpret the one or more gestures as transport operation controls, determine one of the transports has a higher priority than at least one other of the plurality of transports, and apply the one or more gestures associated with the higher priority transport to control movement of the plurality of transports on the roadway.

Still yet another example embodiment includes a non-transitory computer readable storage medium configured to store instructions that when executed cause a processor to perform one or more of identifying a plurality of transports operating on a roadway, identifying one or more gestures performed by one or more of a plurality of transport occupants located inside the transports, interpreting the one or more gestures as transport operation controls, determining one of the transports has a higher priority than at least one other of the plurality of transports, and applying the one or more gestures associated with the higher priority transport to control movement of the plurality of transports on the roadway.

DETAILED DESCRIPTION

Figure 1A:
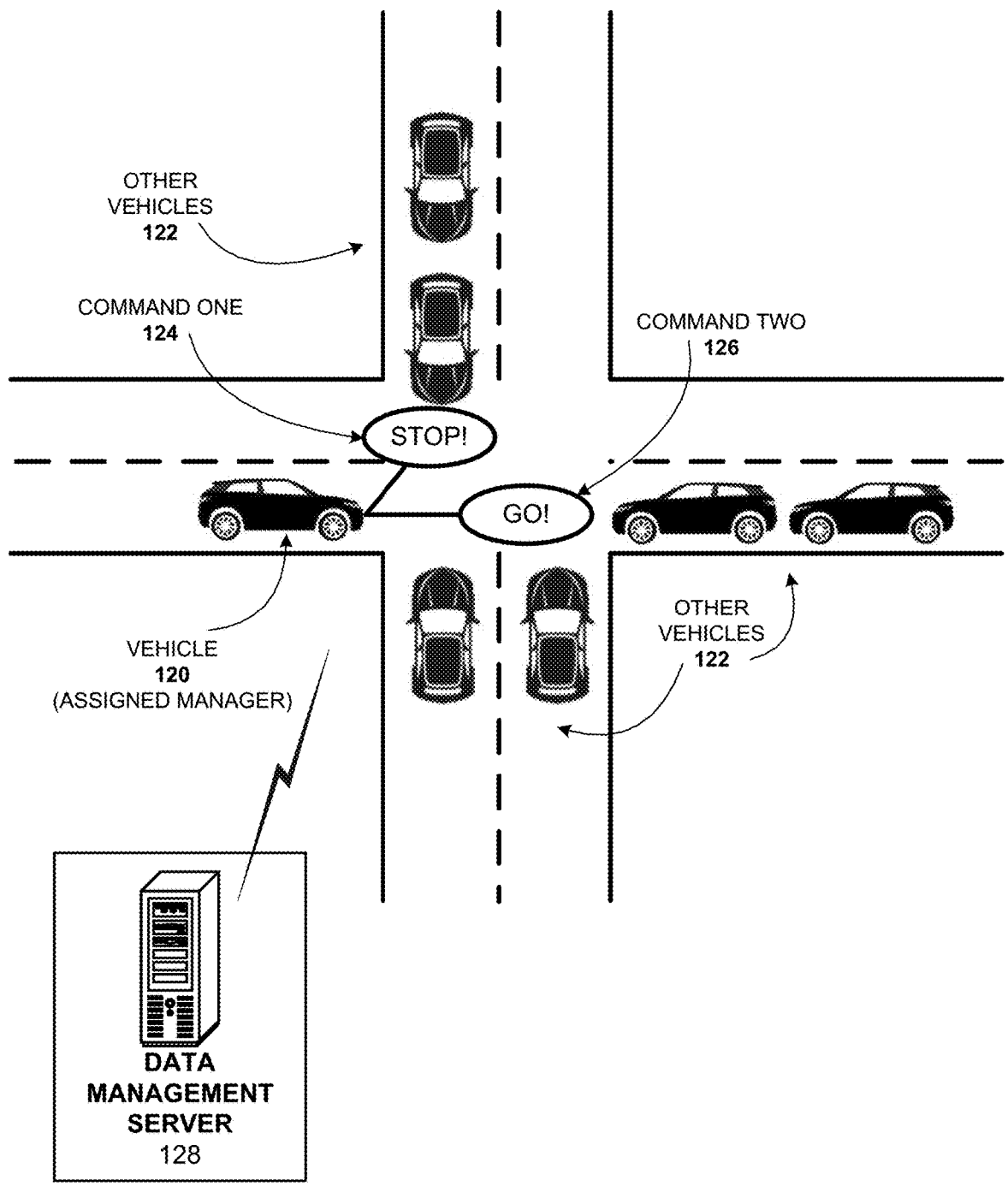
FIG. 1A illustrates an example network diagram of a transport traffic scenario, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout least this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of cars, trucks, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, a packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) a data collection system, a data monitoring system, a verification system, an authorization system and a vehicle data distribution system. The vehicle status condition data, received in the form of communication update messages, such as wireless data network communications and/or wired communication messages, may be received and processed to identify vehicle/transport status conditions and provide feedback as to the condition changes of a transport. In one example, a user profile may be applied to a particular transport/vehicle to authorize a current vehicle event, service stops at service stations, and to authorize subsequent vehicle rental services. In another example, the user profile may be used to identify a user priority status when operating/riding in a vehicle. The priority may provide a way to assign traffic management rights to a particular user and a corresponding transport/vehicle. In another example, a vehicle may be configured to identify gestures for communicating with persons in a roadway, and to share traffic management signaling/communications between vehicles and their occupants. Also, a vehicle may be configured to apply an occupant's profile to identified locations and whether identified locations, persons and/or other objects pertain to certain occupant profile attributes.

Within the communication infrastructure, a decentralized database is a distributed storage system which includes multiple nodes that communicate with each other. A blockchain is an example of a decentralized database which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permissionless blockchain, anyone can participate without a specific identity. Public blockchains can involve cryptocurrencies and use consensus based on various protocols such as proof of work (PoW). On the other hand, a permissioned blockchain database provides a system which can secure interactions among a group of entities which share a common goal, but which do not or cannot fully trust one another, such as businesses that exchange funds, goods, information, and the like. The instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is an entry log which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments include providing a vehicle traffic management configuration to a particular vehicle. For example, a vehicle may be selected to direct traffic and control other vehicles on a roadway in an autonomous manner and under certain circumstances. In another example embodiment, a vehicle may be configured to manage safety measures when a person is on or near a roadway, and may be attempting to communicate with the vehicle via gestures or movements. In another example embodiment, the vehicle may be set up to monitor locations, objects and persons (e.g., facial recognition), to identify persons, retrieve their profiles and pair the attributes of one person with those of the vehicle occupants for optimal meeting opportunities. In another example embodiment, gestures may be identified by a vehicle and interpreted into vehicle-to-vehicle signaling for optimal vehicle communications with other vehicles and roadway objects configured to communicate with such a vehicle. The vehicle may be monitored via one or more sensors which report sensed data to a central controller computer device in the vehicle, which in turn, is forwarded to a management server for review and action.

A sensor may be located on one or more of the interior of the transport, the exterior of the transport, on a fixed object apart from the transport, and on another transport near to the transport. The sensor may also be associated with the transport's speed, the transport's braking, the transport's acceleration, fuel levels, service needs, the gear-shifting of the transport, the transport's steering, and the like. The notion of a sensor may also be a device, such as a mobile device. Also, sensor information may be used to identify whether the vehicle is operating safely and whether the occupant user has engaged in any unexpected vehicle conditions, such as during the vehicle access period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group. Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database.

Data shared and received may be stored in a database which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

In another embodiment, a gesture training model is included wherein data from at least one vehicle is received by a server in a network. The data is utilized as input to the gesture training model through the use of machine learning.

In yet another embodiment, the gesture interpretation and execution is performed by a computer, such an on-site transport computer.

In yet another embodiment, at least one sensor on the transport receives gestures from outside entities, such as humans geographically located outside of the transport.

FIG. 1A illustrates an example network diagram of a transport encountering a transport traffic scenario, according to example embodiments. Referring to FIG. 1A, the configuration 100 provides a roadway intersection with increasing vehicle traffic, such as a vehicle 120 of interest and other vehicles 122. A data management server 128 and the vehicle 120 may be configured to communicate (i.e., via a cellular communication network, local network, etc.) with one another (and with other vehicles, as well as devices within the vehicles and outside of the vehicles, such as wireless devices and/or other devices containing a processor and memory). The information received or accessed by the data management server 128 can be used to identify an amount of traffic observed by the vehicle 120 (and other vehicles), such as an increase in vehicle traffic (and/or pedestrian traffic, in an embodiment) and whether such increase or a total number of observed vehicles within a defined area (i.e., 1000 square yards, a 2-mile radius, an intersection, a street or highway, in or around a particular structure, etc.), has exceeded a threshold amount of vehicles (or a speed per vehicle and/or an average speed of all vehicles, etc.). For instance, as the vehicle 120 approaches an intersection, a set of operations may occur which includes identifying a current traffic scenario, evaluating a traffic management effort required to alleviate the increase in traffic, and which vehicle(s) should perform such an effort and to what extent the assigned vehicle should execute such tasks. The threshold(s) can be stored in the data management server 128 and/or one or more of the transports (in a memory communicably coupled to a processor) and provided/updated by a qualified individual and/or entity such as a government, municipality/city, third-party, etc.

In one example, the vehicle 120 may be any of a plurality of vehicles approaching an area of vehicles, such as an area where traffic is becoming slow and may be creating a safety risk due to an increase in chances of a collision. The vehicle 120 may perform identifying a plurality of transports operating on a roadway, such as via a camera, audio or other sensors, which detect the other vehicles as well as their direction, counts the number of vehicles, and evaluates a total number of vehicles. The server 128 may receive a live feed, an uploaded message or other indicator from the vehicle 120 regarding the total number of vehicles on the roadway within a defined area, such as a predefined distance radius. The server 128 may receive the data from the vehicle 120 (and/or other vehicles) and identify there are a certain number of vehicles beyond a vehicle threshold (Tv). In this event, the server may identify the vehicle 120 is the best suited to be assigned as the traffic manager for a period of time or until the number of vehicles is reduced. The process may also include determining a degree of transport traffic based on the plurality of identified transports. The degree may be a measurement of a number of cars within a defined area, an amount of noise, such as honking or vehicle engine noise indicating an excess of vehicles in particular area, and/or a time of day, a time of month, a day of the week, a recent change in the area such as related to construction and/or a recent increase in a number of accidents near the area of interest, etc. The degree of transport traffic, based on any of the aforementioned traffic characteristics, may exceed a particular traffic level, and the server 128 and/or a different management entity (i.e., a previous or current roadway manager) may then assign one or more of the plurality of identified transports as a roadway manager. Once the roadway manager is assigned, the vehicle may be controlled, or given information to control, by the server or another remote entity to begin managing traffic. The movement of the roadway manager may be controlled by the server 128 and any one or more of a display, lights, an audio speaker, text, video or other signal indicator which may be engaged to generate commands, such as stop 124 and go 126. The roadway indicators may be affixed to the one or more roadway managers to direct the plurality of identified transports along the roadway in a vehicle-to-vehicle communication language that can be received, processed and interpreted by the other vehicles, such as by sensors on the other vehicles configured to receive light, audio and other signaling and process the signals via an on-board computer. The language between the vehicles may be a simple impulse language such as MORSE code expressed through light impulses, audio impulses and other signaling.

When assigning the transport(s) as a roadway manager a movement of the roadway manager may be paused while the roadway indicator(s) are generated and produced by the roadway manager based on a characteristic of the transport traffic, such as a need to stop, go, turn, wait, etc. As many vehicles may not be autonomous, the drivers of those vehicles may be able to view a display device affixed to, or integrated with, the manager vehicles, that produces roadway signs which are familiar to drivers, such as an image of a stop sign on a display embedded or affixed to the window of the vehicle or within the window of the vehicle. The vehicle manager may be assigned as a hired entity, such as a contracted vehicle that is licensed and registered to perform such tasks. The vehicle profile may be a candidate to be designated as a manager for a period of time.

The roadway indicator may include one or more of a road sign display, a light display, a text indicator, a video indicator, a wireless data message command, and an audio indicator to direct the plurality of identified transports. The other transports may detect the indicia produced by the manager or may receive messages from the manager via a direct communication protocol or via a cellular data network medium. Once a manager is assigned, the other vehicles may also be monitored and controlled so as not to usurp the manager's authority. For example, the vehicles may become dormant or slow until controlled by the manager's indicators and instructions.

The process may further provide detecting the roadway indicator via one or more of the plurality of identified transports, and responsive to detecting the roadway indicator, retrieving transport operation instructions from a memory, such as via a computer or other data networking device with access to a databank of commands and interpretation data, and controlling movements of the plurality of identified transports based on the retrieved transport operation instructions. After a period of time, the degree of transport traffic may no longer be exceeding the traffic level, and removing the roadway manager assignment from the one or more of the plurality of identified transports may occur to permit traffic to move freely without a traffic manager.

During the manager assignment process, and responsive to determining when the degree of transport traffic has exceeded the traffic level, a smart contract may be referenced to identify one or more of the identified plurality of transports on the roadway to be assigned as a roadway manager. The vehicles may be registered as potential managers based on reputation scores, registration, occupant profiles and reputation information, etc. When using the smart contract to invoke the manager selection process, a blockchain transaction is created to include information, such as one or more of the roadway manager identification information, a date, a time, a compensation and a location of the roadway traffic. The blockchain transaction is then stored in a distributed ledger for audit purposes.

Figure 1B:
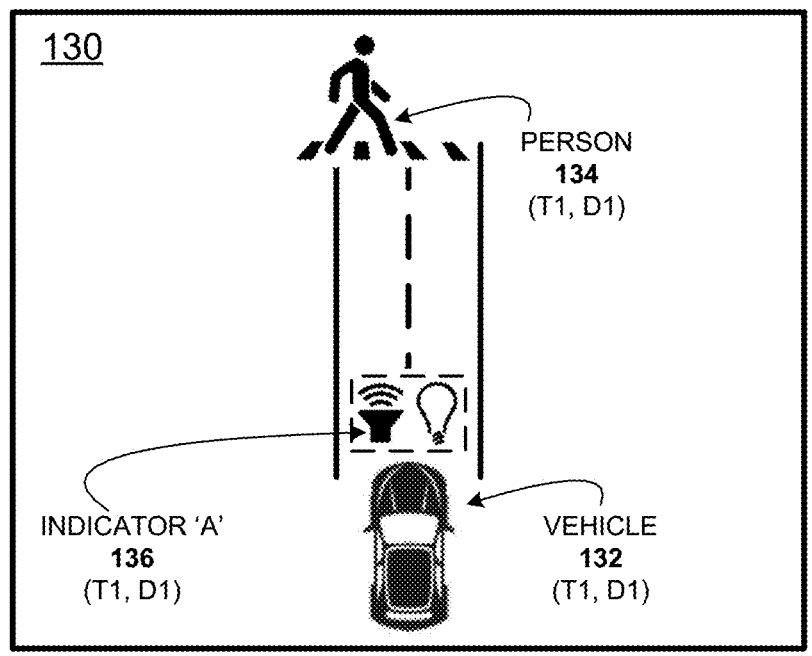
FIGS. 1B and 1C illustrate an example network diagram of a transport encountering a person in a roadway, according to example embodiments.
Figure 1C:
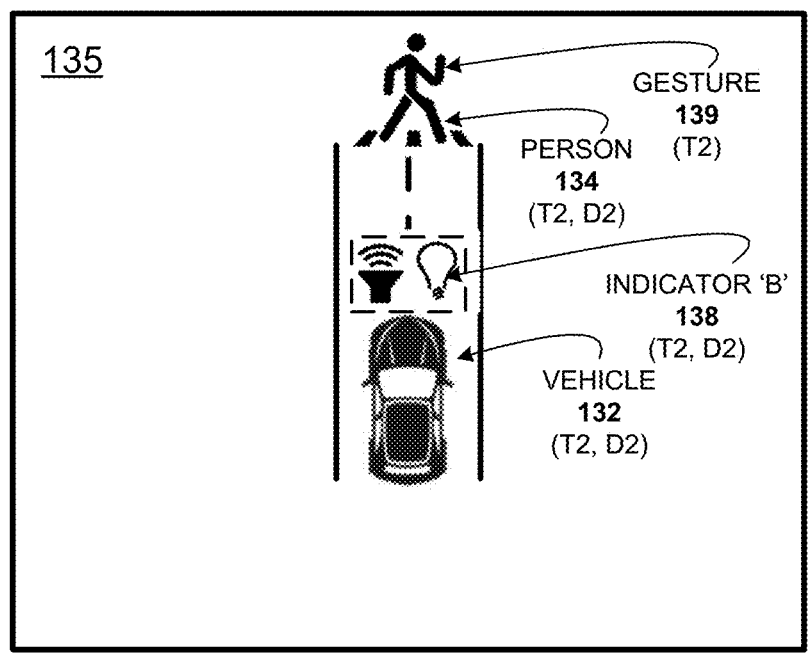

FIGS. 1B & 1C illustrate an example network diagram of a transport encountering a person in the roadway, according to example embodiments. Referring to FIG. 1B, the example 130 provides a scenario where the vehicle 132 is configured, at a first time and distance T1/D1, from a person identified by a detector/sensor of the vehicle, to identify the person 134 as a person near, in, and/or entering the roadway used by the vehicle. The distance between the vehicle and the person at that time T1, a speed of the vehicle at that time, and a position of the person's body at that time with respect to the roadway and/or the vehicle, etc. may all be used as information for identifying a person as a roadway obstruction (or potential roadway obstruction) while the vehicle moves along the roadway. In the detection phase, the camera, sensors, etc., detect the object and identify the object as a person based on one or more algorithms, such as a geometry matching algorithm that matches the detected roadway person to a known object stored in memory, such as in the data management server 128.

In operation, the vehicle 132 may identify the person via a shape matching operation where the shape of the person, identified from an image capture of a camera of the vehicle 132, is matched to a known or approximate shape of a person stored in memory. At the first time T1 and distance D1 134, the vehicle 132 may identify the person 134 and determine that the relative threat level of the person's safety is at a first level, if that level is below a threat threshold (Tt), the vehicle may take no action at that time, or, the vehicle may perform a simple indicator 136, such as a quick flash of the lights, a quick honk of the horn or other audible device, a slight slowdown of the current speed to anticipate the next decision regarding the person's safety, etc. In one embodiment, the vehicle, via one or more algorithms and/or sensors, can determine an object in the roadway is a person, a direction of the movement of the person and a speed of the movement. Such determinations can be used to move the vehicle (or alert a driver of the vehicle, or a person controlling the vehicle) to a lane where the person is moving away from at a speed such that the person can safely be in the lane away from where the vehicle is heading. In another embodiment, the vehicle 132 can determine if other vehicles may be headed toward the person and alert those vehicles of such a scenario via vehicle-to-vehicle (V2V) communication, via the data management server 128, or via another wireless and/or wired network (not shown), The sensors used by the vehicle may be located on or in the vehicle, or may be located on objects apart from the vehicle (such as light poles, street signs, buildings, other transports, etc.). When the threat is identified as being above the threshold, based on any one or more of the current vehicle speed, a location of the vehicle (e.g., safety concern zones, highly populated areas, school zones, public venues, etc.), the vehicle may take an action, such as an indicator to alert the person e.g., flash of the lights, honk of the horn, etc.).

In another example, the vehicle may use one or more detectors, such as a camera, to identify the person's movements and/or gestures. For example, when detecting a gesture, via the transport, performed by the person, the gesture may be identified as an indication that the person is prompting the vehicle to proceed and keep moving, by a hand movement being interpreted as beckoning the transport to proceed, while the person waits on a side of the roadway. Another gesture example, with reference to configuration 135 of FIG. 1C, provides a person 134 with a hand movement gesture 139 at a later time T2 and shorter distance D2 between the person and the vehicle 132 than the previous distance D1. In this example, responsive to detecting the gesture, a second threat level determination may be performed at the second time to determine whether the threat threshold has been exceeded. The determination may be a function of speed, time of day, location, position of the person in the roadway, such as whether the person is on the edge of the roadway or closer to the center of the roadway, whether a gesture can be detected, etc. The gesture may serve as an override, for example, if the person gestures the car to continue by performing a gesture, such as moving in a circular or back-and-forth motion as a beckon to keep moving. In such a scenario, the vehicle may continue moving. However, if the person is near the center of the roadway, then the indicator 'B' 138 may be a louder honk, a brighter and more repetitive light flashing and/or other features such as a higher degree of breaking, stopping, and even swerving the vehicle's motion away from the person until the threat level is reevaluated and the vehicle can determine the threat has been revoked, such as when the person is no longer in the roadway. In the case of the threat being alleviated, responsive to the second threat level determination being identified as below the threshold, the transport may proceed along the roadway. In one embodiment, the person 134 may hold up a stop gesture, such as gesture 139, which would cause the transport to stop until a sensor (s) detected the user was a safe distance away from the transport. The threat levels may be based on a speed of transport, a direction of the transport and a distance between the transport and the person.

When evaluating whether the vehicle is still a threat to the person, the vehicle may detect that the person is deviating away from the transport based on one or more of a location of the person at the second time and a position of the person's body at the second time, such as a turned and walking position versus a static position near the center of the roadway. Responsive to identifying the person is deviating away from the transport, a gesture may be interpreted by the transport as an opportunity to proceed along the roadway. The identifying of the person as deviating away from entering or leaving the roadway may be based on one or more of a location of the person at the second time and a position of the person's body at the second time.

Figure 1D:
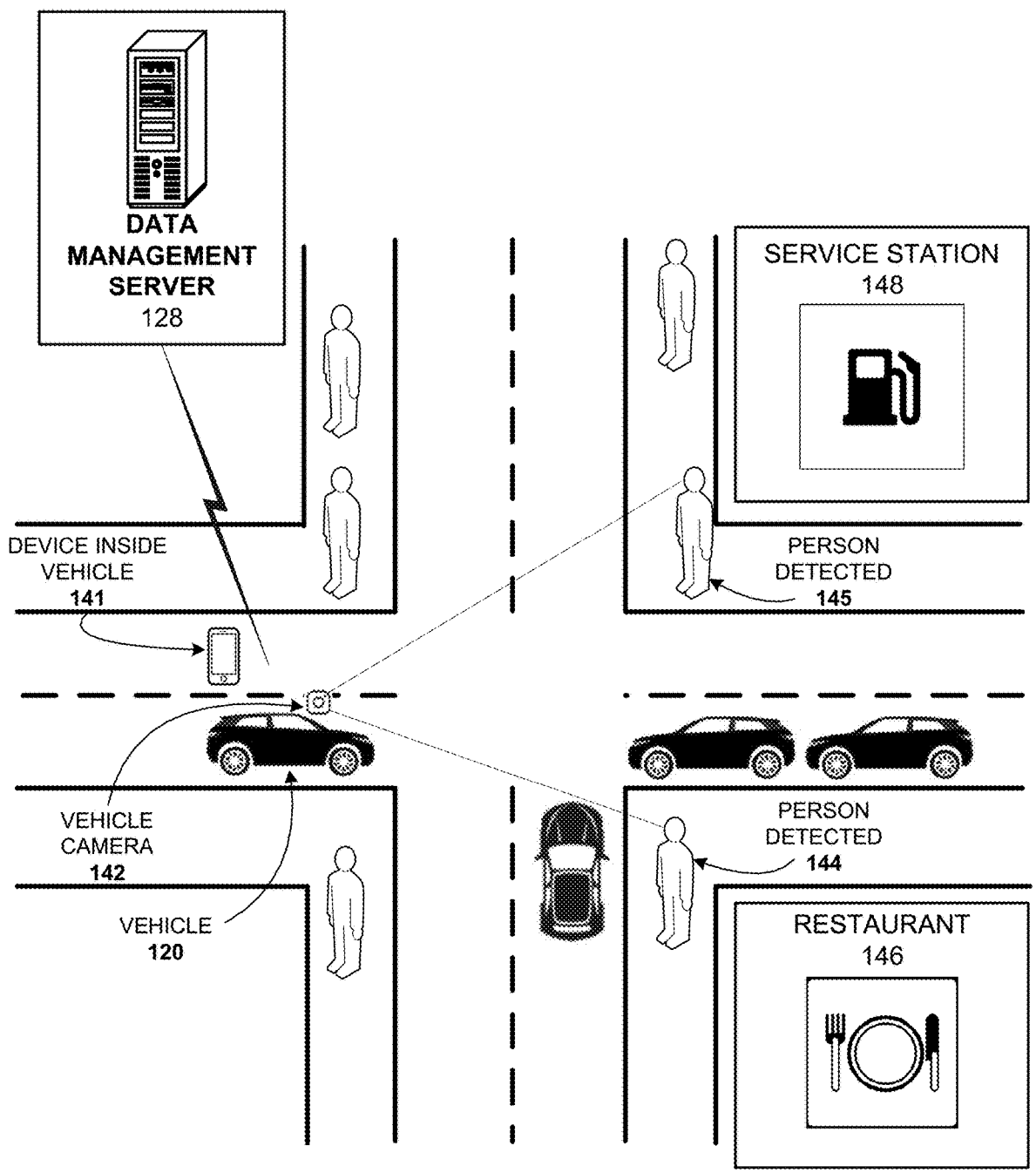
FIG. 1D illustrates an example of a transport identifying persons near a roadway area, according to example embodiments.

FIG. 1D illustrates an example of a transport identifying persons near a roadway area, according to example embodiments. Referring to FIG. 1D, the example 140 includes a vehicle 120 traveling through a populated area. The vehicle may be monitoring for identifiable areas, such as a service station 148, a restaurant 146 and other places which can be used to park the vehicle. The vehicle detector (i.e., sensor(s), camera 142, etc.) may be used to identify various persons as well by facial recognition. A device inside the vehicle 141 may provide a profile of one or more occupants of the vehicle, which can be used to determine a user's goals, schedule, objectives, likes, dislikes, etc., so an identified object, such as a person can be identified and potentially matched via the person's profile to those profile attributes of the vehicle occupant for a potential connection opportunity. The profile of one or more occupants of the vehicle can also be pre-entered in a memory of the vehicle or may be provided to the memory of the vehicle when an occupant's mobile device is used to reserve or access a vehicle.

In operation, a periphery of the vehicle 120 may include a range of area where the vehicle detector/camera 142 can scan and identify one or more persons which are in proximity to the vehicle/transport 120. In this example certain persons 144 and 145 near a roadway, such as on a sidewalk or rest area, are viewed and identified by the vehicle camera 142. The images of their faces or other defining attributes can be identified and matched to a known set of profiles to identify matches. Any matched profile/person can be used to retrieve information about the persons identified from a database accessible by the vehicle or from the occupant's device(s), which can be compared to profile information of the vehicle occupants. For example, when determining the identified person matches one or more profile attributes of a profile of at least one transport occupant, an attribute of the person's profile may match an attribute identified from the occupant's profile, such as a need for assistance from any type of service provider such as a plumber, lawyer or nutritionist identified from the vehicle occupant's profile. The need can be identified from a written statement included in the user's online social media profile, a previous email, a text message, an entry into a system such as the data management server 128 or application hosted on another server but accessible by/to the vehicle and occupant's and persons devices (who can also post their skills and other information) to receive such information, etc. The process may further include, after identifying a match, creating and sending a notification to a communication device in the transport to prompt the transport occupant(s) about the identified at least one person 144 and 146 and the matched one or more profile attributes. An example may include, alerting the communication device to state: "A nutritionist has been identified nearby, would you like to request a meeting at the closest establishment?". The occupant may then select 'yes' and the application may then attempt to contact the person's device so a message may be created and sent to the person. Such a message may state: "Would you like to meet a potential client at the nearest establishment?". The answer provided by the person may cause additional information to be provided about the occupant and their need(s) to the person and for a meeting to be scheduled.

When attempting to match the person's profile to the transport occupant profile, the profile attributes of the identified person(s), which are stored in the profile of the person, are identified and matched to one or more profile attributes of the transport occupant(s). The matching may include determining that the profile of the person is a known contact of the transport occupant, such as a social network contact, phone contact, etc., and/or the profile of the at least one person matches at least one interest of the at least one transport occupant, such an identified interest may be stored in the one or more profile attributes of the at least one transport occupant. When the profile of the at least one person is a known contact of the at least one transport occupant, or, the profile of the at least one person matches at least one interest of the at least one transport occupant, a suggested meeting is created between the at least one transport occupant and the at least one person and a meeting request is sent to the communication device and the mobile device so the invited parties can confirm a meeting time and location. The identification process may include locating and identifying at least one person in an area adjacent to a roadway currently used by the transport. Another location where the person can be identified may be in another transport traveling within a proximity of the transport, or traveling toward the transport or to a similar destination of the transport, and/or at a facility within proximity of the transport. The camera(s) and/or other sensors can identify the person(s) and share the information with the occupants assuming the persons are within a predefined distance of the transport.

Figure 1E:
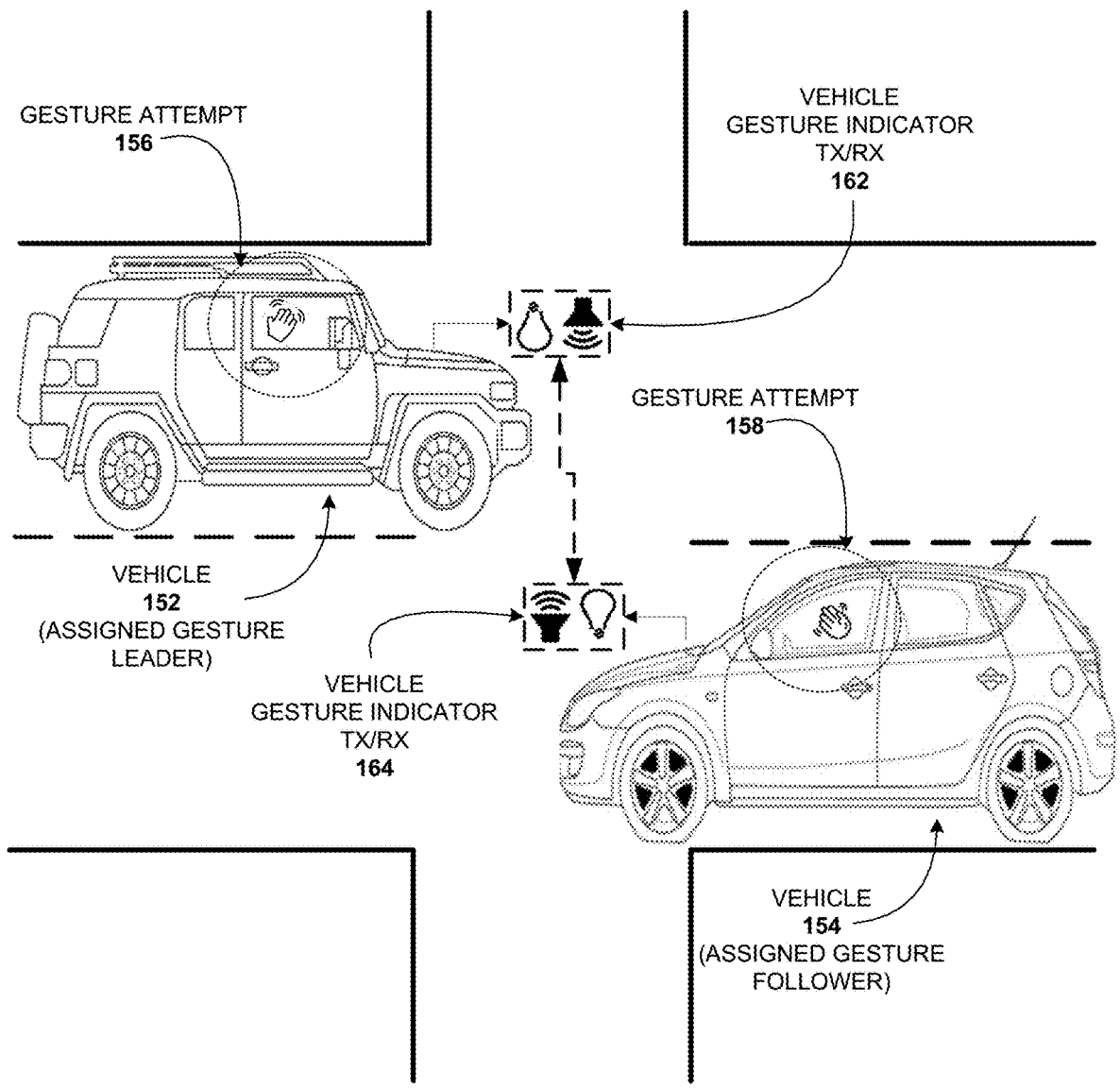
FIG. 1E illustrates an example of a transport communicating with another transport based on transport occupant gestures, according to example embodiments.

FIG. 1E illustrates an example of a transport communicating with another transport via transport signaling based on transport occupant gestures, according to example embodiments. Referring to FIG. 1E, the example configuration 150 includes more than one vehicle 152 and 154 on a roadway. The vehicles may be traveling in a path where they will eventually meet at an intersection or other roadway configuration where they may need to observe traffic cautionary signaling to avoid a collision. In this example, the occupants in the vehicle may engage in a type of in-vehicle gesturing where they are using their hands or other body parts (such as their heads, mouths, eyes, arms, etc.) to motion one another to proceed, stop, wait, etc., as occupants may normally do at four-way stops and other intersections with a high likelihood of collision occurrence or delay.

In operation, the vehicles 152 and 154 may be traveling in opposite directions, and as they vehicles approach one another, such as at a four-way stop, the occupants in the vehicles may attempt to gesture one another. For example, gesture attempt 156 may be performed to alert the occupant in vehicle 154 to proceed, stop, wait, etc. The occupant in vehicle 154 may also be attempting to gesture 158 to alert the occupant in vehicle 152 to take a similar action or a different action. The vehicles may have internal detectors, sensors, cameras, and the like, which detect and forward (directly or via an on-board processor or device) the gestures, via a wired and/or wireless connection, to a computing device (e.g., local on-board device, remote server, etc.) which can interpret the one or more gestures as transport operation controls, such as instructions to have the other vehicles go, stay, wait, stop, turn, etc. The vehicles may perform autonomous driving operations and may interpret the gestures into their own vehicle signaling/command language shared from vehicle-to-vehicle. For example, when a gesture attempt is made 158, the vehicle 154 may detect the gesture 158 from inside the vehicle and translate the gesture as a command instructing the other vehicle 152 to proceed while the vehicle 154 waits. The vehicle 154 will detect the movement gesture and compare it to a table of commands for matching and execution. Once a command is matched based on the detected gesture movement, the vehicle may perform a series of indications, such as light, text, video and sound indications, which can be interpreted by the other vehicle 152 via sensors and a computing device configured to interpret the commands sent from gesture indicator hardware 164 and received by the receiving vehicle 152. Similarly, the vehicle 152 may be configured to signal via its own hardware 162 to the vehicle 154 to confirm the gesture commands and then proceed accordingly. Once the signals are interpreted, the vehicle that interpreted the vehicle indicators may proceed to follow those commands.

At a 2-way or 4-way stop sign, for example, the vehicle 154 can determine (vis sensors, cameras, lidar, and the like) that the vehicle 152 may be attempting to turn left if the left blinker is on, if the vehicle 152 approached the stop sign by driving a certain distance to the left and/or the vehicle 152 is turned or positioned slightly to the left as it comes to a stop. A gesture from a driver or a passenger of the vehicle 154 that may already be stopped at the stop sign and have the right-of-way, may be detected by the vehicle 154 via onboard equipment such as sensors, cameras, and the like) and transmitted to the vehicle 152 and/or may detected directly by on-board equipment in the vehicle 152 and parsed to mean an invitation of the vehicle 152 to turn left (or in other examples, turn right or proceed ahead). The vehicle 152 may proceed or may first confirm the gesture from vehicle 154 with its own gesture, such as via a human gesture, light, horn, text or video on the vehicle 152 or may be transmitted wirelessly (via vehicle-to-vehicle (V2V) communication or via a wireless network), to one or more devices that are part of the vehicle 154 or in the vehicle 154 (such as an occupant's mobile device).

In an embodiment, gestures from humans and/or vehicles may be determined by a structure (such as a stop sign, a yield sign, light signal, light pole, building, electrical box, sprinkler equipment box, etc.) with the necessary equipment (such as processors, memories, sensors, cameras, transmitters, receivers, transceivers, etc.) in proximity to the person (s). These gestures are then sent to their respective destinations (vehicles only and/or vehicles and then to occupants). It may be beneficial to have such a structure receive the gestures and act as an intermediary as the necessary equipment may be closer to a person (in the event the vehicle does not contain in-vehicle equipment) or can verify the gesture's meaning (via a database cross-check and/or seeking acknowledgement from the sender/sender's equipment) before transmitting it to the recipient. In the event that more than one of the vehicles are attempting to command the other vehicle to perform a driving action due to multiple occupants gesturing at the same time in separate vehicles, then it may be determined that one of the vehicles has a higher priority than at least one other of the plurality of vehicles. The priority may be based on a type of vehicle (e.g., police car, ambulance, school bus, student driver, etc.), experience, driver credentials, reputation, registered rights and permissions, etc. Then, when the higher priority occupant/vehicle is identified, the gesture that is correctly identified in that vehicle may take priority over other gestures identified in that vehicle and/or in other vehicles and thus the right of way is established for that vehicle in which the gesture is identified as having a higher priority. For example, if an occupant in vehicle 152 and another occupant in vehicle 154 are gesturing at the same time, and the gestures are identified and processed by the computing devices in the respective vehicles, then one gesture would have to take priority over the other, and, in that case, the profile of the occupant and/or vehicle would be used to determine which vehicle has the higher priority based on any of the aforementioned priority criteria. Next, the one or more gestures associated with the higher priority transport are applied to control movement of the plurality of transports on the roadway. The non-priority transports are then instructed through the vehicle-to-vehicle signaling to proceed with following instructions.

In another example embodiment, the vehicles at a busy intersection may identify gestures made by a traffic controller, such as a human cross-walk guard or police person that is directing traffic via stop hand signals, go hand signals, continuing hand signals, etc. The vehicles may override any occupant attempts to drive the vehicle and attempt to interpret the guard's gestures and decide when to accelerate and/or brake the vehicle. Alternatively, the vehicle may indicate to the occupant to drive, stop, etc., and still permit the occupant to drive the vehicle after an indicator (e.g., sound, light, etc.) is enacted inside the vehicle to prompt the occupant to continue/discontinue driving based on the guard's gestures which are identified and interpreted via a detector coupled to the vehicle.

Additionally, a gesture training model may be used to identify the gestures and signaling received from other vehicles on the roadway to actively identify an learn new gestures in a particular community or from particular types of vehicles. For example, as the vehicle-to-vehicle gestures are received and processed, the images and other information and data which are obtained may be stored in a memory of the vehicle or a remote computing device which uses the information to create or assign actions to perform based on the gestures received. The learning process may include adding new gesture models for new gestures received and to perform new actions depending on the interpretation and assignment of those newly assigned gesture models. The remote computing device may store the information and update the vehicle to process such new gestures once the information is processed and stored.

The process of gesture interpretation may include determining one or more of the plurality of transports are operating within a certain distance of an intersection, and determining a first of the one or more gestures detected indicates one of the occupants, operating a first transport 152 of the plurality of transports, has instructed another occupant, operating a second transport 154 of the plurality of transports to move the second transport through the intersection. This process may also work with one unoccupied self-driving vehicle and one occupied driving vehicle, where the occupant instructs the unmanned vehicle to proceed and the interpretation of the vehicle then uses sound and light signals, for example, to instruct the unmanned vehicle to proceed. Also, both vehicles may be autonomous, in which case a higher priority vehicle, such as a city or first responder vehicle may cause the other vehicles to yield via audible and/or light signals while the vehicle proceeds through the intersection.

In one example where there are more than two vehicles, responsive to detecting one or more indicators via the second transport, sent from a first transport, the second transport may move through the intersection, and the same one or more indicators may be detected by a third transport different from the first and second transports. Responsive to the one or more indicators being detected by the third transport, the movement of the one or more other transports may be paused for a period of time. The one or more indicators may include at least one of a light display, a text indicator, a video indicator, an audio indicator, a wireless data message command, a transport braking operation, a transport steering operation, etc.

Figure 1F:
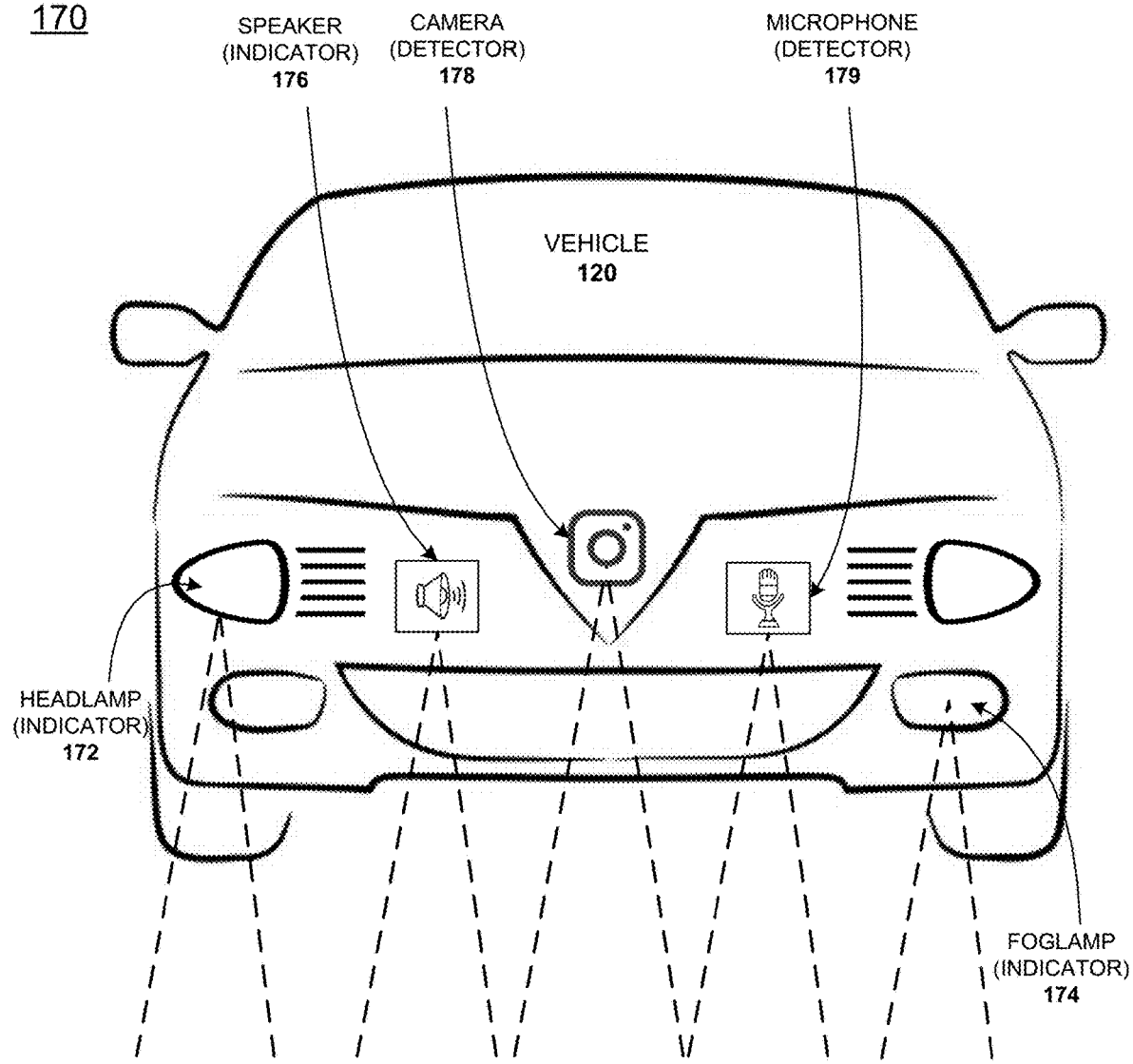
FIG. 1F illustrates an example of a transport utilizing indicators and detectors to share and receive roadway signaling from other communication entities, according to example embodiments.

FIG. 1F illustrates an example of a transport utilizing indicators and sensory based detectors to share and receive roadway signaling from other communication entities and/or road signals and signs, according to example embodiments. Referring to FIG. 1F, the example 170 provides a vehicle detection and/or indicator system. For example, a vehicle 120 may have indicators, such as a headlamp light 172, a foglamp 174, and a speaker 176, which can be controlled by an on-board and/or off-board computer/controller to command the indicators to engage in a pattern of vehicle language recognized by other vehicles' detectors/sensors. The signals can be identified, processed and interpreted into vehicle movement commands via the on-board and/or off-board computer/controller. The vehicles may also have certain detectors, such as a camera 178 and microphone 179. Also, light and sound sensors may be used to detect sound and light signals sent from other vehicles which can, in turn, be interpreted into vehicle movement commands. For example, the commanding vehicle may display two quick light flashes to another vehicle, which indicates a "go" command. The vehicle may instead provide one flash of the light and a horn sound, which indicates that it will proceed and the other vehicle should stop. In the illustration, the dotted lines represent a field of range each of the detectors and indicators. The camera 178 can be used to identify various images of conditions and other indicia of the environment and other vehicles attempting to provide signal information to the vehicle. Various patterns of output produced by both the detectors and indicators can be used to provide information to ensure better reception of the information. For example, an indicator/headlamp 172 can be used to emit light informing a further vehicle to proceed, while a detector/camera 178 can be used to capture images indicating the action has been taken by the further vehicle. In the event the further vehicle does not take the action (i.e. does not proceed), another indicator can be used (such as the speaker 176) to alert the further vehicle and/or the driver of the further vehicle to proceed. In an embodiment, the speaker 176 can be used to alert the further vehicle and/or the driver of the further vehicle that an instruction/information was sent that was not followed and to be prepared to receive the instruction again (via the headlamp 172).

Figure 1G:
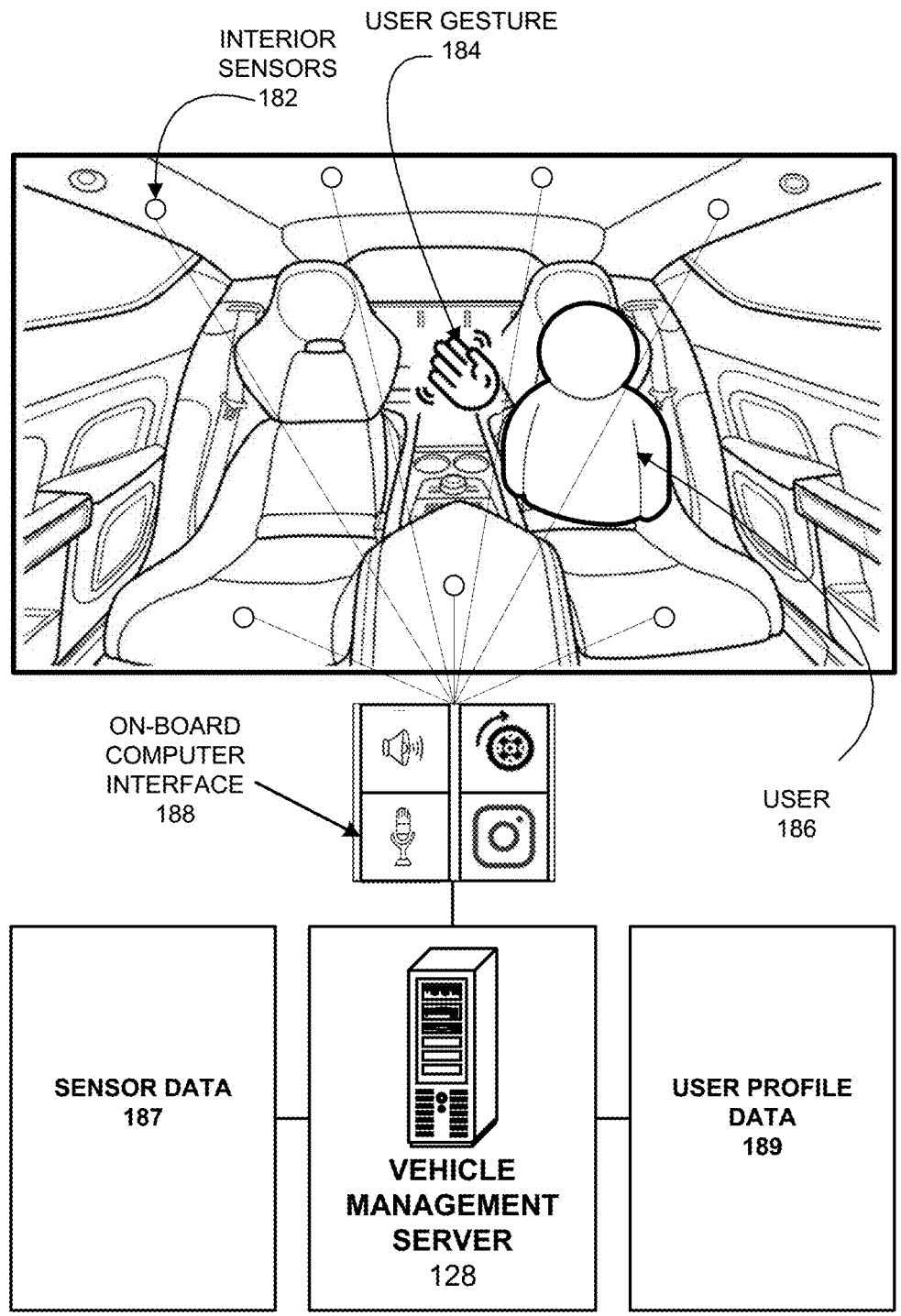
FIG. 1G illustrates an example of a transport interior environment receiving and processing gesture commands by a transport occupant, according to example embodiments.

FIG. 1G illustrates an example of a transport interior environment receiving and processing gesture commands by a transport occupant, according to example embodiments. Referring to FIG. 1G, the example 180 includes a vehicle interior with various sensors 182 some of which may be configured to identify the hand gesture 184 of the user/occupant 186 and attempt to match the identified gesture to a known gesture stored in an on-board and/or off-board memory. In other embodiments, non-vehicle interior sensors, such as a mobile device such as a phone, watch, glasses that include gesture recognition hardware and/or software, can be used to provide gesture and other information to a recipient and/or recipient device. Once a match is made between the input movement gesture and the known gesture, based on a degree of precision of image matching, a table of gestures/commands may be used to identify what indication to provide to the other vehicle(s). The on-board computer interface 188 may process the signals received from the various sensors and/or share the information with the vehicle management server 128, which can then store the sensor data 187 and the user profile data 189 to perform a multitude of tasks such as to identify the purpose of the gesture, a priority of the gesture, an acceptance of the gesture, and whether to attempt to control other transports on the roadway based on the user gesture detected inside the vehicle.

Figure 1H:
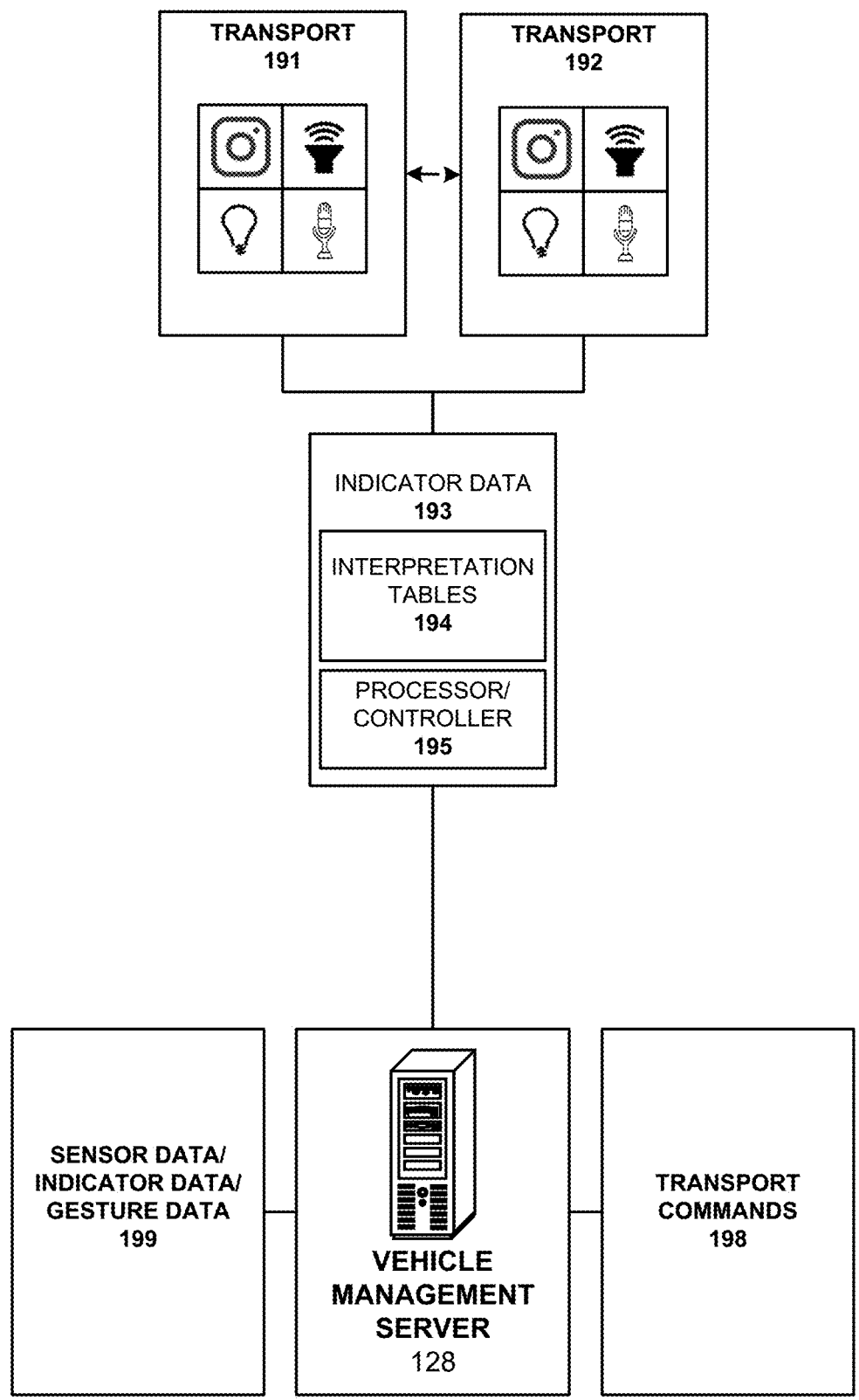
FIG. 1H illustrates an example network configuration of a transport-to-transport indicator operation, according to example embodiments.

FIG. 1H illustrates an example network configuration of a transport-to-transport indicator sharing and receiving operation, according to example embodiments. Referring to FIG. 1H, the example 190 provides a scenario where the transports 191 and 192 are using their detectors and signaling elements to communicate in a vehicle-to-vehicle language scenario, such as signal impulse languages, including but not limited to MORSE code. The data that is received and sent from one vehicle to another may be stored on-board and/or off-board as indicator data 193, which can be used to reference interpretation tables 194 for gesture to command matching purposes. The computing module in this example may also have a processor/controller 195 to process the gesture data into identifiable data which can be matched to known gestures and commands and to transmit such information to the vehicle management server 128. The vehicle management server 128 may store the sensor data, indicator data and/or the gesture data 199 needed to perform the language interpretation between occupants and the vehicles and the respective transport commands 198 and provide that information, or make it available, to the transports, to other transports, and/or to other entities.

Figure 2A:
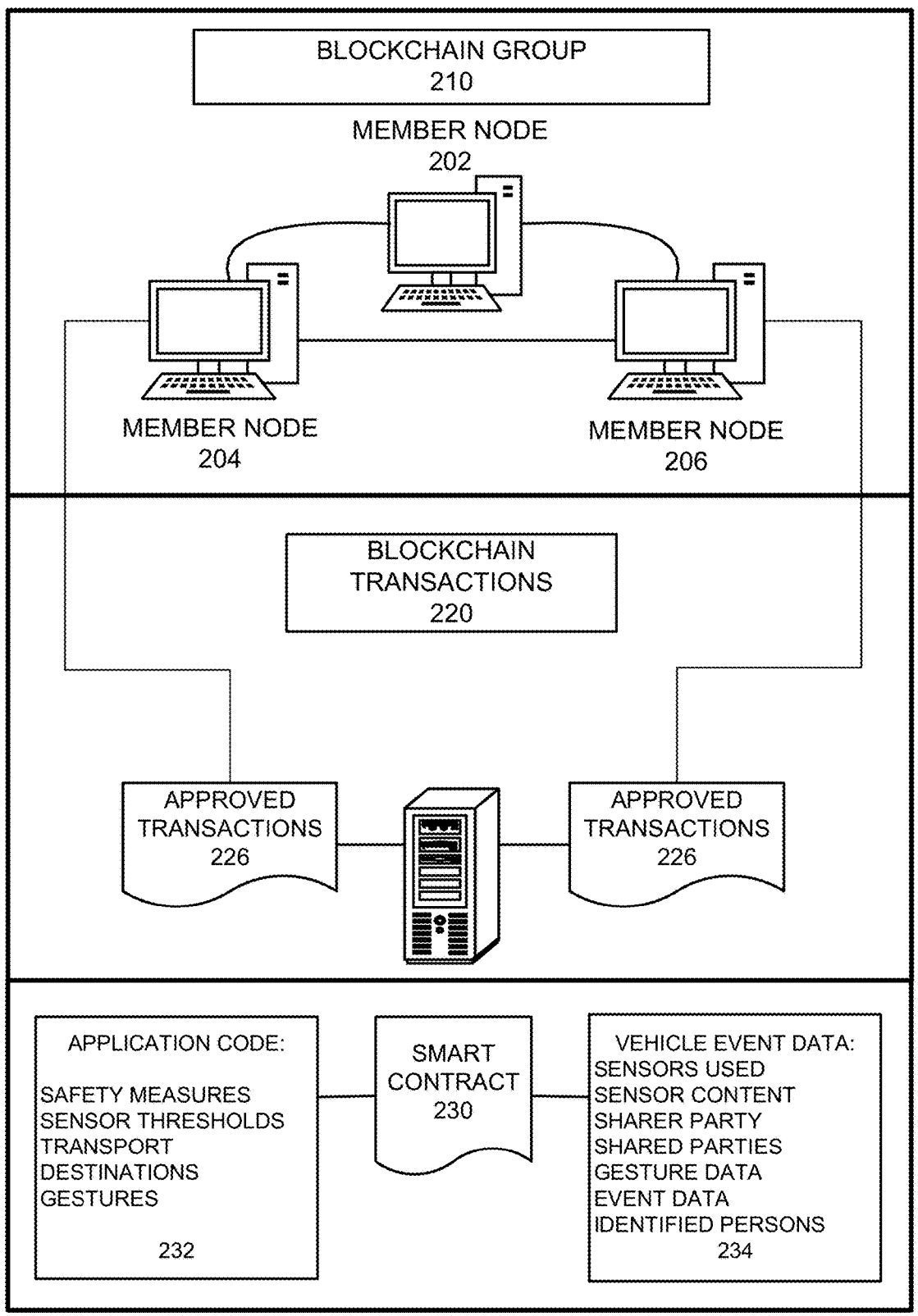
FIG. 2A illustrates a blockchain configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain member nodes 202-206 as part of a blockchain group 210. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 220 are stored in memory of computers as the transactions are received and approved by the consensus model dictated by the members' nodes. Approved transactions 226 are stored in current blocks of the blockchain and committed to the blockchain via a committal procedure which includes performing a hash of the data contents of the transactions in a current block and referencing a previous hash of a previous block. Within the blockchain, one or more smart contracts 230 may exist that define the terms of transaction agreements and actions included in smart contract executable application code 232, such as registered recipients, vehicle features, requirements, permissions, sensor thresholds, gesture data, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 234, such as a location(s) to be traveled, an average speed, a top speed, acceleration rates, whether there were any collisions, was the expected route taken, what is the next destination, whether safety measures are in place, whether the vehicle has enough charge/fuel, and other data, such as gesture data, identified persons, traffic conditions, etc. All such information may be the basis of smart contract terms 230, which are then stored in a blockchain. For example, sensor thresholds stored in the smart contract can be used as the basis for whether a detected service is necessary and when and where the service should be performed.

Figure 2B:
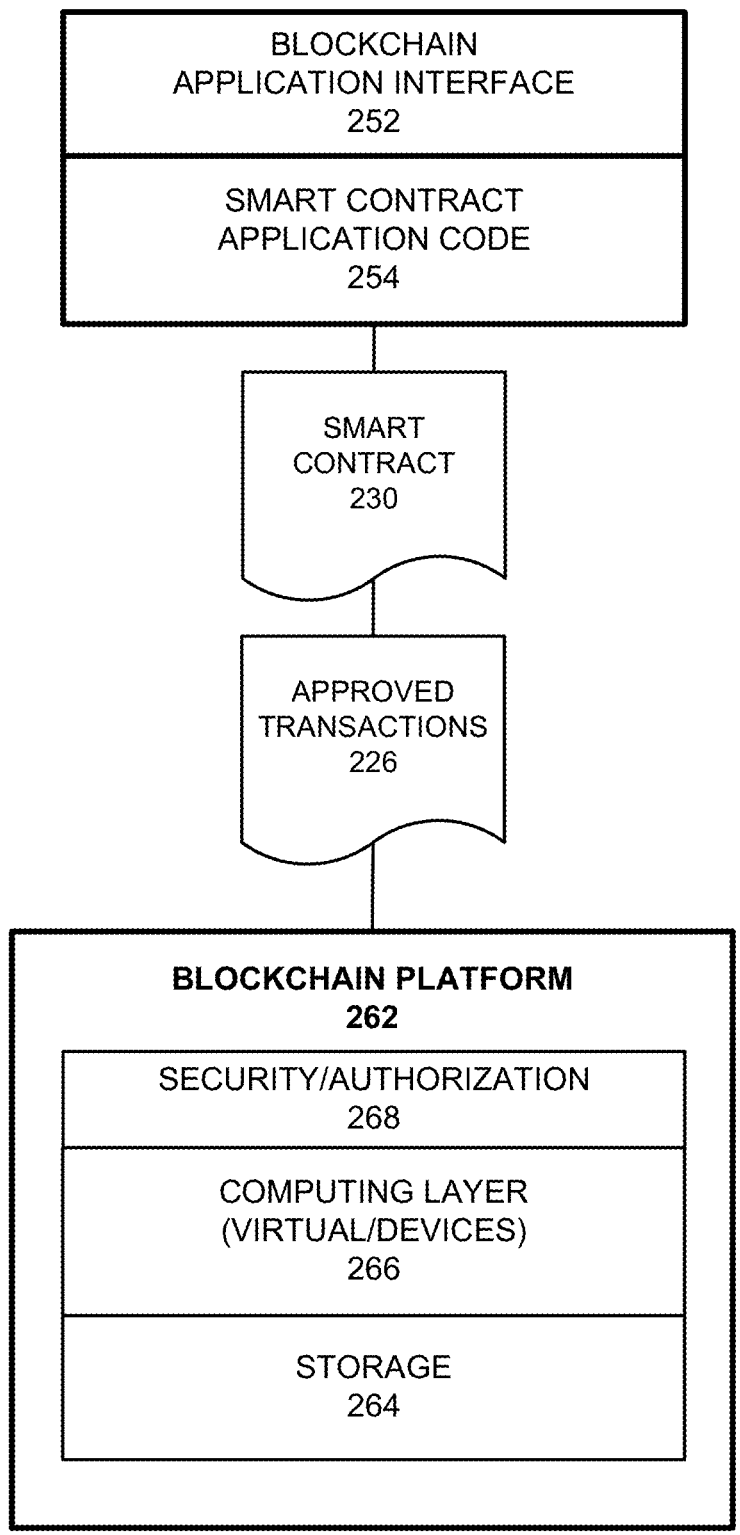
FIG. 2B illustrates another blockchain configuration, according to example embodiments.

FIG. 2B illustrates a shared ledger configuration, according to example embodiments. Referring to FIG. 2B, the blockchain logic example 250 includes a blockchain application interface 252 as an API or plug-in application that links to the computing device and execution platform for a particular transaction. The blockchain configuration 250 may include one or more applications which are linked to application programming interfaces (APIs) to access and execute stored program/application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code 254 provides a basis for the blockchain transactions by establishing application code which when executed causes the transaction terms and conditions to become active. The smart contract 230, when executed, causes certain approved transactions 226 to be generated, which are then forwarded to the blockchain platform 262. The platform includes a security/authorization 268, computing devices which execute the transaction management 266 and a storage portion 264 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 2A and 2B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 2C:
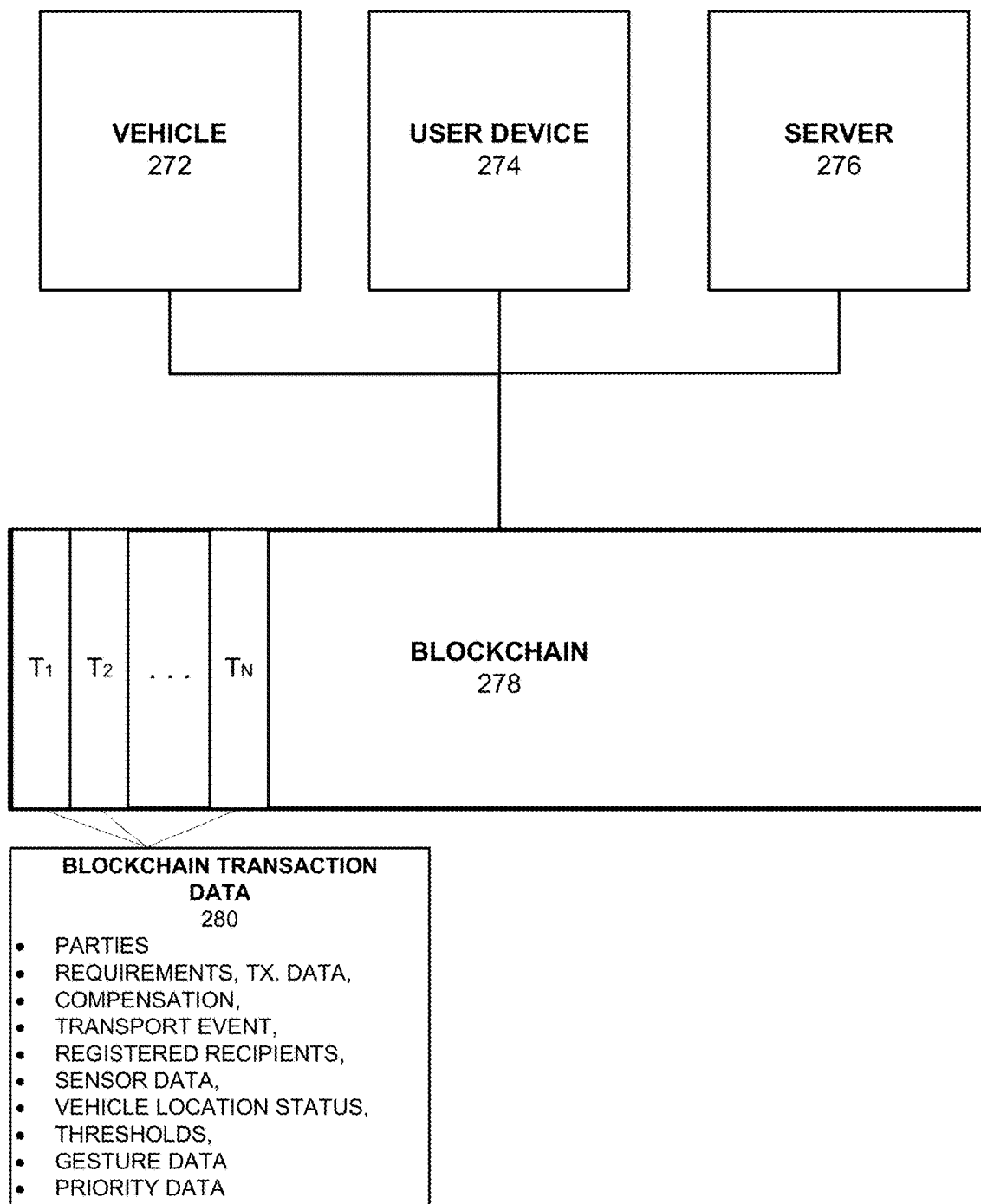
FIG. 2C illustrates a further blockchain configuration, according to example embodiments.

FIG. 2C illustrates a blockchain configuration for storing blockchain transaction data, according to example embodiments. Referring to FIG. 2C, the example configuration 270 provides for the vehicle 272, the user device 274 and a server 276 sharing information with a distributed ledger (i.e., blockchain) 278. The server may represent a service provider entity inquiring with a vehicle service provider to share user profile rating information in the event that a known and established user profile is attempting to rent a vehicle with an established rated profile. The server 276 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 280 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed. Also, in other examples, the transaction data may indicate gesture data, traffic condition data, traffic signal data received or sent, etc.

Figure 3A:
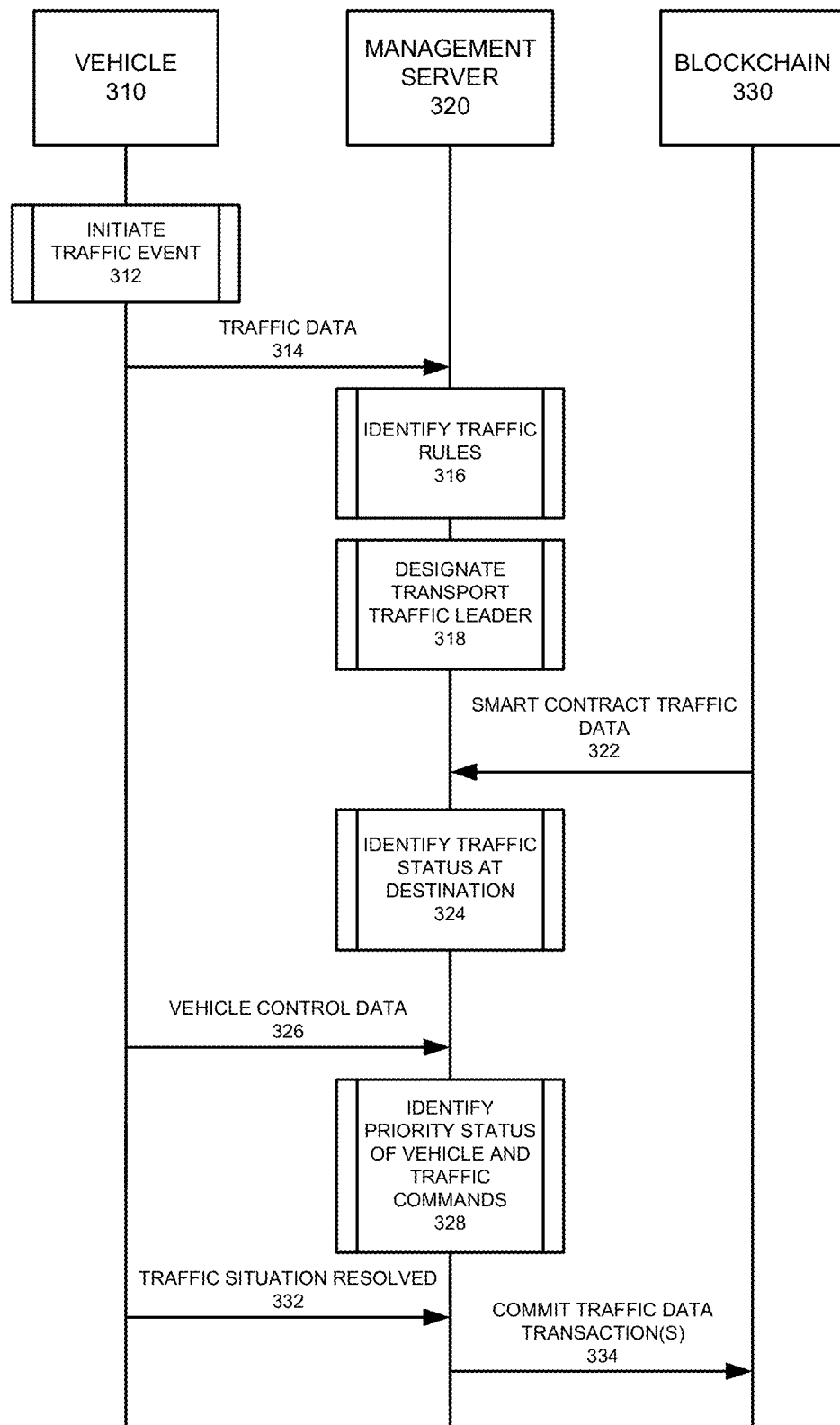
FIG. 3A illustrates a system diagram of a traffic management configuration utilizing a distributed ledger, according to example embodiments.

FIG. 3A illustrates a vehicle traffic and gesture management system configuration, according to example embodiments. Referring to FIG. 3A, the system 300 provides a vehicle 310, such as one of many vehicles attempting to move along a roadway. The vehicle 310 may approach a traffic event area identified by the vehicle 310 and/or a management server 320 (which may receive road, traffic and weather information from a variety of sources including sensors and cameras on-board and off-board the vehicles, including from other vehicles) and initiate a traffic event managed by one of assigned vehicle managers or a gesture event where the vehicle 310 is attempting to communicate 312 with another vehicle or a server for traffic management purposes. The identified traffic data 314 may be sent to the management server 320 for traffic management purposes. The traffic rules 316 may be identified according to pre-stored and/or real-time rules for managing the traffic management vehicle. Once the traffic manager/leader is designated 318 based on timing (i.e., first to arrive at the designated traffic area), a reputation score or registered status of the vehicle, a smart contract which defines the rules for the traffic event may be provided 322 by a blockchain data source 330 which may be resident on the management server 320 or on a different source. The traffic status is monitored and identified (on a continuous or semi-continuous basis) at the destination area 324 so the manager vehicle can conduct traffic commands to other vehicles via traffic control data 326, which is stored in the server 320 for example. The status of the vehicle, such as a priority status awarded to the manager and other commands performed by the vehicle 310, as well as identifying whether the manager's commands were followed and various traffic conditions, may be identified and stored 328 for audit purposes. When the manager vehicle 310 has identified the traffic status as resolved 332 (i.e., amount of traffic has fallen below traffic threshold, a traffic management period of time has expired, etc.) the designation as the traffic manager or traffic leader is removed from the vehicle 310. In one embodiment, multiple vehicles may concurrently be traffic managers or leaders. All commands performed by the management vehicle, other vehicles proximate the management vehicle, the statuses of the traffic, date, time, location and profile information of occupants and vehicles may be stored 334 in a blockchain transaction and stored in the blockchain 330.

Figure 3B:
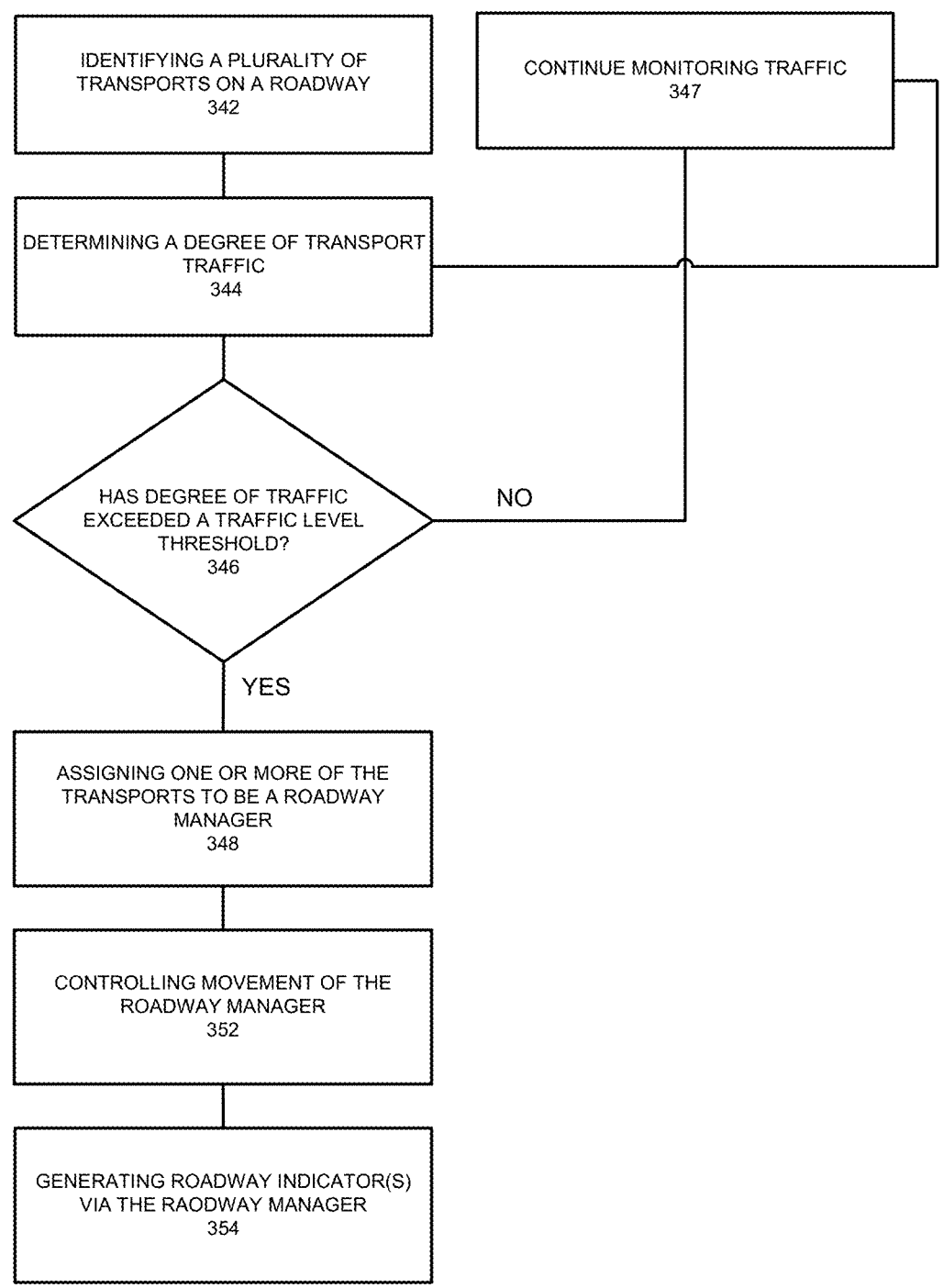
FIG. 3B illustrates a flow diagram of a transport traffic management configuration, according to example embodiments.

FIG. 3B illustrates a flow diagram of a transport traffic management configuration, according to example embodiments. Referring to FIG. 3B, the logic flow diagram 340 includes an example process of assigning a roadway manager. In this example, the various transports or vehicles on a roadway and/or inside a particular area are identified 342 and are monitored 344 to determine a degree (or amount) of traffic and if the degree of traffic has exceeded or not exceeded the degree of traffic 346. If the traffic has not exceeded the degree of traffic (or traffic threshold), the traffic is continued to be monitored 347. If the vehicle movements on the roadway and/or inside the particular area are too slow and/or there are too many vehicles that exceed the degree of traffic (or the traffic threshold) then the degree of transport traffic is identified as being above that traffic threshold and a roadway manager is assigned to alleviate the traffic conditions 348. The movements of the roadway manager may be controlled 352 by a traffic application operating inside the vehicle and/or via a remote server configured to control the traffic management effort. For example, the roadway manager may then create indicators 354, such as lights, sounds, text, video and/or displays (e.g., stop sign, go signs, etc.) via a display(s) embedded in and/or on the vehicle body.

Figure 3C:
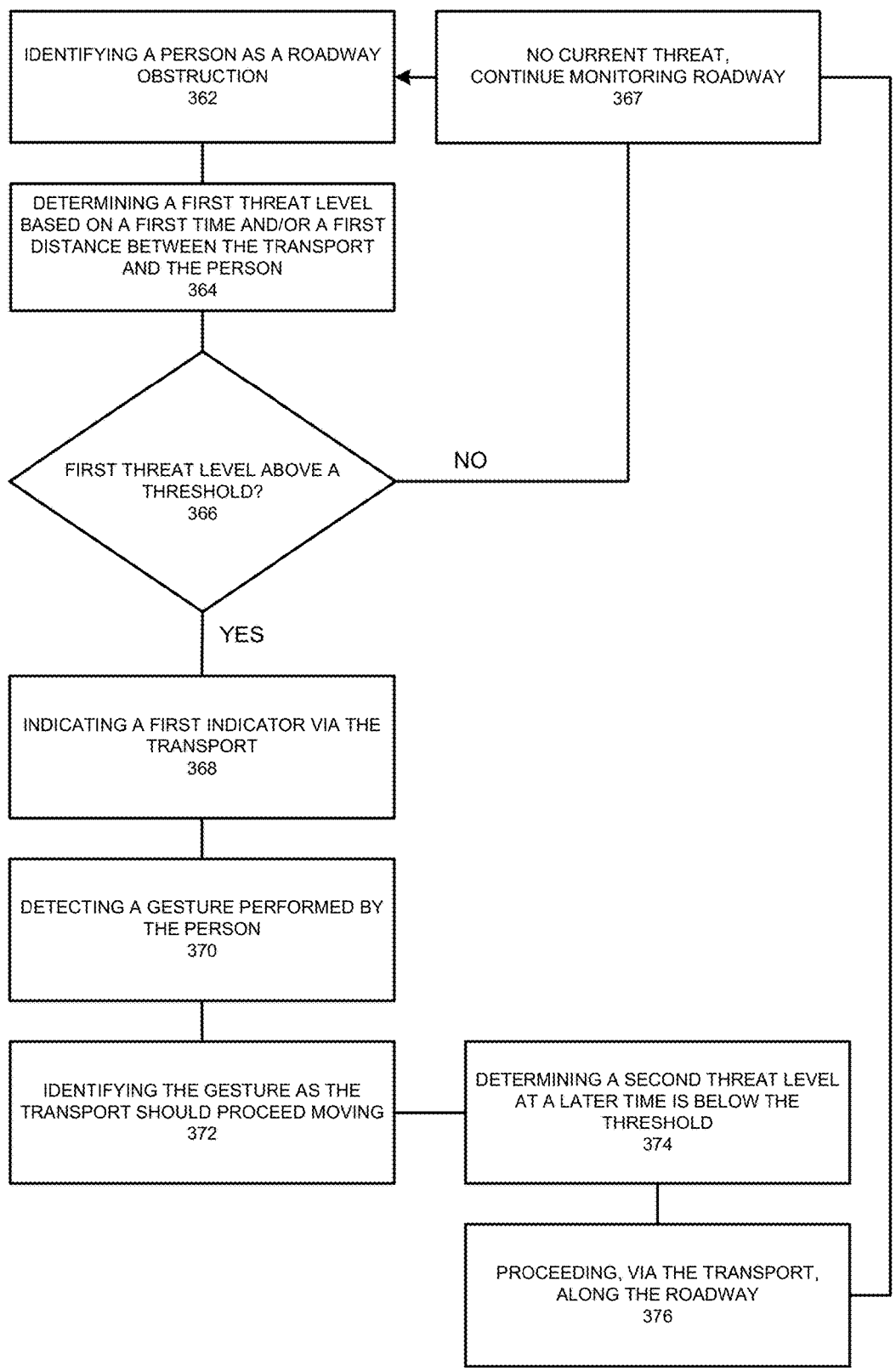
FIG. 3C illustrates a flow diagram of a transport roadway safety configuration, according to example embodiments.

FIG. 3C illustrates a flow diagram of a transport roadway safety configuration, according to example embodiments. Referring to FIG. 3C, the logic flow 360 provides an example process of identifying a person in a roadway as an obstruction 362. The person may be identified via a sensor(s) and/or a camera(s) on-board and/or off-board the vehicle traveling in the roadway. The threat level is determined at a first time and/or distance 364 so a preemptive action can be taken to alleviate a potential threat. If a threat level is not above a threshold 366, the roadway continues to be monitored 367. In one embodiment, certain actions may be taken even when the threat level is not deemed to be high, such as a honk of the horn, a flash of the lights, etc. to notify the person of the vehicle's presence. When the threat level is above the threshold (or at the threshold), a first indicator is performed 368 to alert at least one of the vehicle occupants, the person(s) in the roadway and/or approaching the roadway, other vehicles in a vicinity of the vehicle and/or the person(s), individuals and/or devices and servers monitoring and/or controlling the vehicle, etc. about the particular threat. The vehicle may detect a gesture performed by the person 370 and may interpret the gesture for added feedback and/or actionable measures. For example, the gesture could be directing the vehicle to keep moving 372 or may be indicating that the vehicle should stop or slow down. The vehicle would detect and decipher the gesture via on-board and/or off-board equipment including sensors, cameras, mobile devices, processors, memories, transceivers, and the like. At a later time, the threat level is reevaluated (and may be continuously reevaluated) to identify whether the threat threshold is still exceeded or has dropped to or below the threshold 374. When the threat level is below the threshold, the vehicle may continue moving along the roadway 376 and continue monitoring for new threats.

Figure 3D:
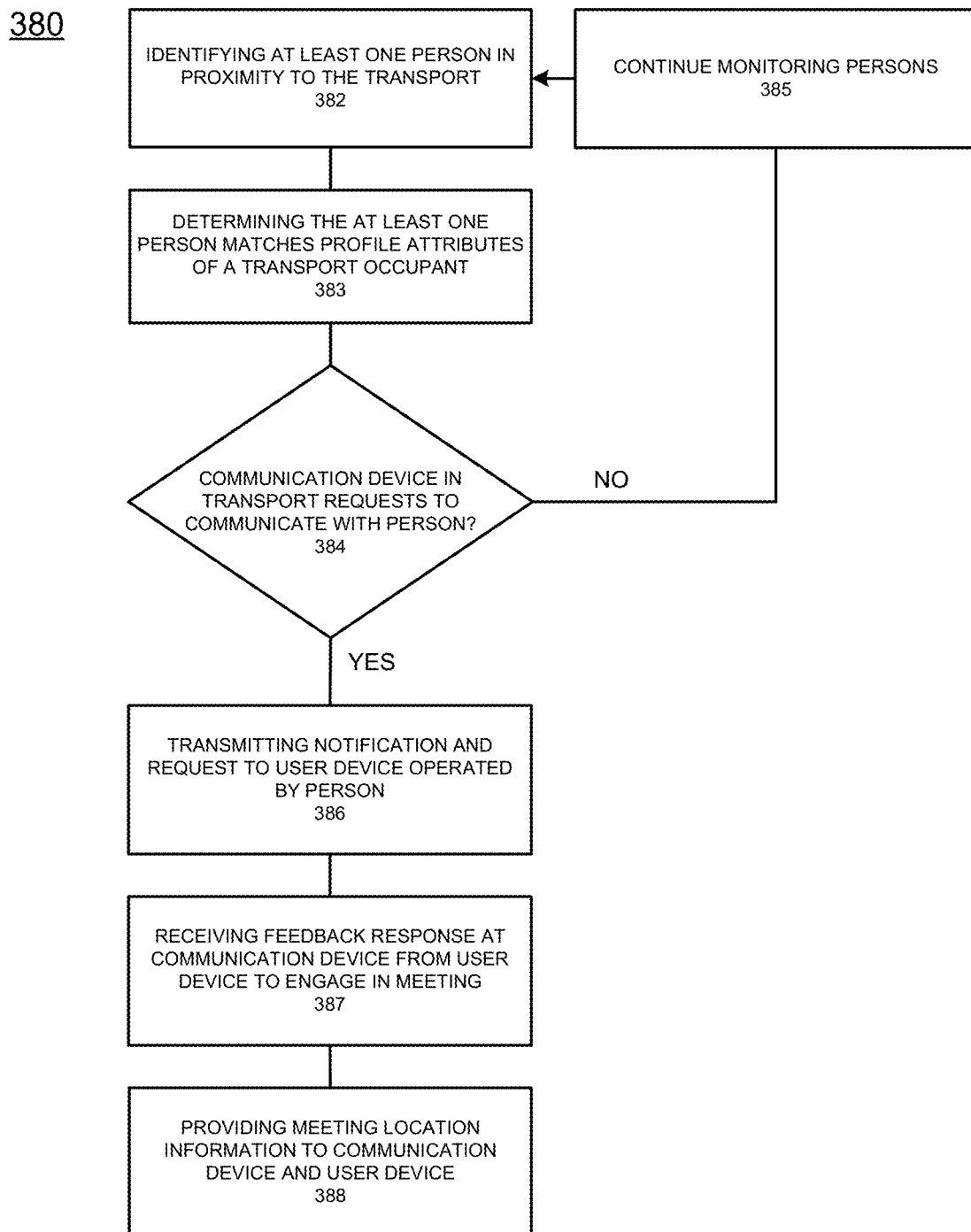
FIG. 3D illustrates a flow diagram of a transport person identification configuration, according to example embodiments.

FIG. 3D illustrates a flow diagram of a transport person identification configuration, according to example embodiments. Referring to FIG. 3D, the example 380 provides identifying one or more persons near roadways and other areas for profile matching or for identification purposes. In this example, a person is identified as being in proximity to the transport 382 via on-board and/or off-board equipment including sensors, cameras, mobile devices, processors, memories, transceivers, software and the like which may be communicably coupled to one another. The process continues by determining whether the person matches profile attributes of one or more transport occupants 383 or attributes of the occupant(s) and the person(s) match or overlap in an area of need (such as to fulfil a good, service, request, question, etc. The attribute(s) and the matching of them can occur via the on-board and/or off-board equipment. When a match is confirmed, a message can be sent to the matched or identified person 384. If a match is not confirmed (or if the person cannot be identified) then the monitoring of persons is continued 385. If the person is matched via one or more attributes of both the person's prolife and the profile of the occupant(s), then a notification is created (on-board and/or off-board) and sent to the person's communication device (via contact information, such as a phone number, email address, social media account, etc., stored on-board and or off-board) requesting a meeting 386. The person may accept or reject the invitation 387 depending on their preferences and availability or may ask for additional information before accepting or rejecting. If the person accepts, then a meeting location information may be sent to both parties to create a time and place to meet 388 based on at least one of a location of the transport, a location of the occupant, a location of the person, etc. A location may be selected in proximity to where the vehicle could park and/or stop to allow the occupant(s) to exit. and to where the person could walk-up and then engage in the meeting location.

Figure 3E:
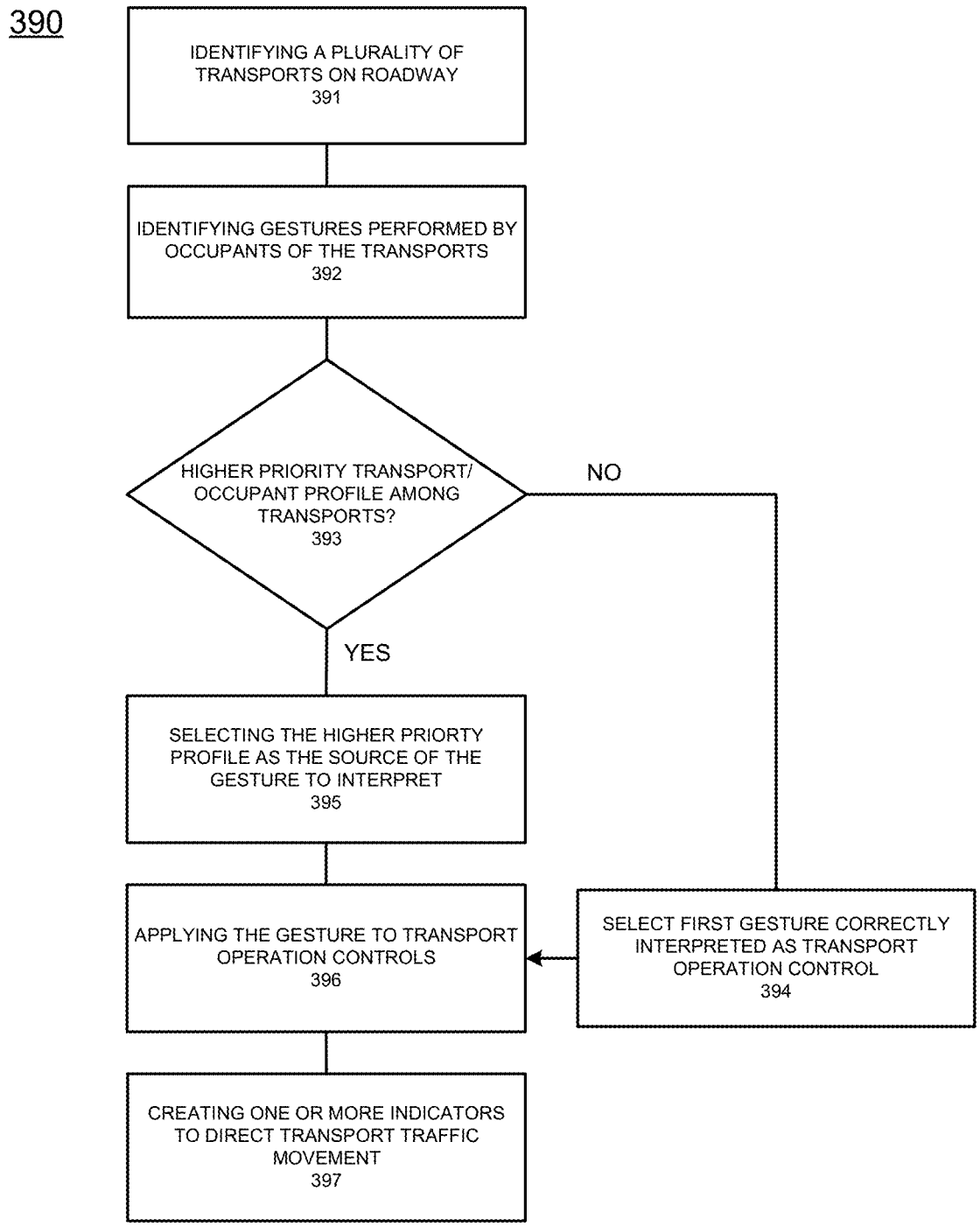
FIG. 3E illustrates a flow diagram of a gesture interpretation and transport management configuration, according to example embodiments.

FIG. 3E illustrates a flow diagram of a gesture interpretation and transport management configuration, according to example embodiments. Referring to FIG. 3E, the logic flow diagram 390 includes a process for managing vehicle traffic and occupant gestures during roadway traffic engagements. The process may include identifying a plurality of transports on the roadway 391, such as in a particular area and/or by a particular density, such as near an intersection. The transports/vehicles may have one or more occupants in each of the vehicles gesturing via their heads, eyes, mouths, hands, arms, etc., to cue the other occupants in other vehicles to perform certain traffic actions, such as stop, go, slow, fast, wait, etc. The gestures may be identified by sensors in the vehicles 392. When multiple gestures are detected from occupants in multiple vehicles in a certain period of time, a management authority, such as a remote server or other data processing entity identifies which gestures were received first or second, etc., (Tg1, Tg2 . . . Tgn), and whether those vehicle/occupant profiles have a higher priority than others due to a type of vehicle, a reputation score from previous driving history, previous gesture communications, etc. A reputation score can be incremented (or decremented) each time a vehicle has performed a vehicle driving event successfully (or unsuccessfully) by receiving commands from other vehicles, providing commands to others, having gestures interpreted properly (or improperly), etc. When a higher priority transport/occupant profile is identified among the transports 393, then that profile is selected as the source of the gesture to receive, process and interpret prior to any others. If no higher priority profile is available to elevate the gesture status, then the first gesture to be recognized as a proper gesture is used instead 394. The higher priority profile is selected to be used when available 395, and the gesture detected from that vehicle is used to control or influence operations of other vehicles 396 via the signaling and/or indicators provided by the vehicle and based on the gesture detected. The gesture is used to match an indicator(s) in a translation table and the vehicle-to-vehicle communication (either directly or via a server) may result based on the occupant's gesture to cause transport movement signaling 397.

Figure 4A:
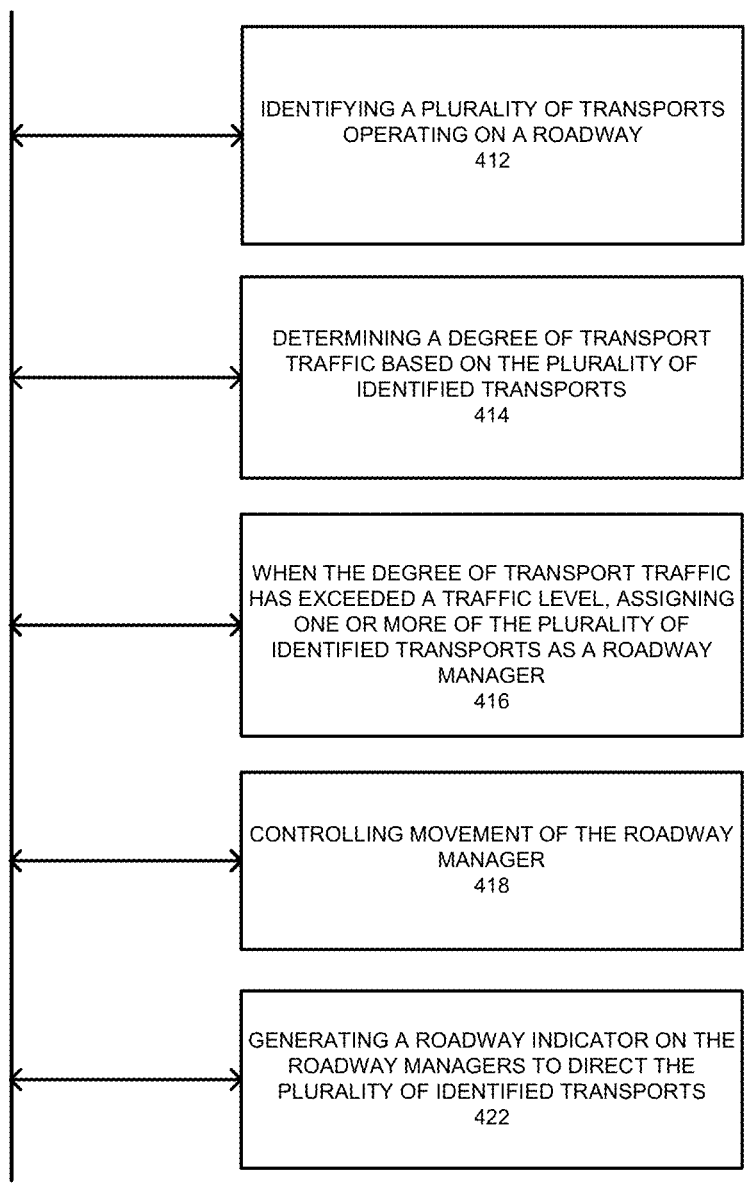
FIG. 4A illustrates a flow diagram of a transport traffic management configuration, according to example embodiments.

FIG. 4A illustrates a flow diagram of a transport traffic management configuration, according to example embodiments. Referring to FIG. 4A, the example process 400 provides identifying a plurality of transports operating on a roadway 412, determining a degree of transport traffic based on the plurality of identified transports 414, when the degree of transport traffic has exceeded a traffic level, assigning one or more of the plurality of identified transports as a roadway manager 416, controlling movement of the roadway manager 418, such as through an automated computer application and/or a remote device, to move the manager into an optimal traffic directing position, such as into a middle of an intersection, and generating a roadway indicator on the one or more roadway manager to direct the plurality of identified transports 422.

The process also includes assigning the one or more of the plurality of identified transports as a roadway manager, pausing a movement of the roadway manager, in one example, and generating the roadway indicator on the roadway manager based on a characteristic of the transport traffic. The roadway indicator includes one or more of a road sign display, a light display, a text indicator, a video indicator, a wireless data message command, and an audio indicator to direct the plurality of identified transports. The process also includes detecting the roadway indicator via one or more of the plurality of identified transports, responsive to detecting the roadway indicator, retrieving transport operation instructions from a memory, and moving the one or more of the plurality of identified transports based on the retrieved transport operation instructions. After a period of time, the process may perform determining the degree of transport traffic is no longer exceeding the traffic level, and removing the roadway manager assignment from the one or more of the plurality of identified transports. Responsive to determining when the degree of transport traffic has exceeded the traffic level, the process also includes identifying from a smart contract, one or more of the identified plurality of transports to be assigned as a roadway manager, and creating a blockchain transaction comprising one or more of the roadway manager, a date, a time, and a location of the roadway traffic, and storing the blockchain transaction in a distributed ledger.

Figure 4B:
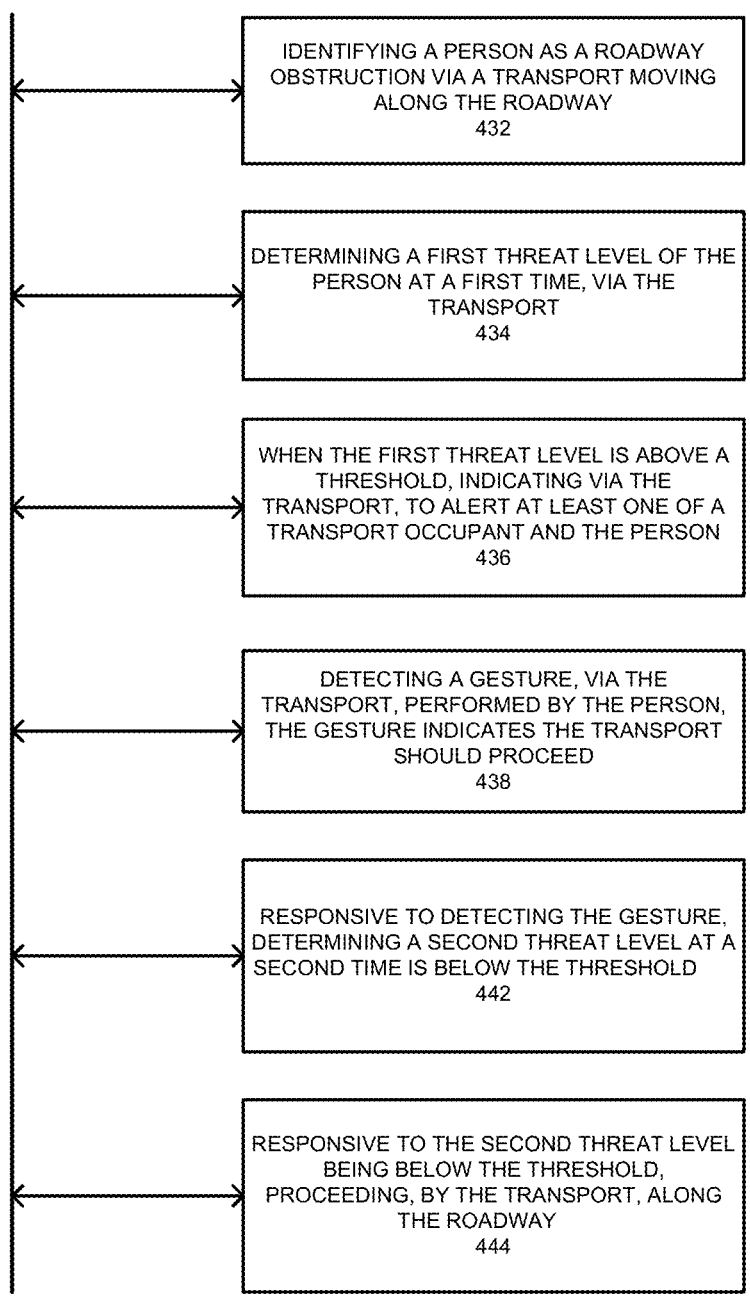
FIG. 4B illustrates a flow diagram of a transport roadway safety configuration, according to example embodiments.

FIG. 4B illustrates a flow diagram of a transport roadway safety configuration, according to example embodiments. Referring to FIG. 4B, the process 430 may include identifying a person as a roadway obstruction via a transport moving along the roadway 432, determining a first threat level of the person at a first time, via the transport 434, when the first threat level is above a threshold, indicating via the transport, to alert at least one of an occupant of the transport and the person 436, detecting a gesture, via the transport, performed by the person, and the gesture indicates the transport should proceed 438, responsive to detecting the gesture, determining a second threat level at a second time is below the threshold 442, and responsive to the second threat level being below the threshold, proceeding, by the transport, along the roadway 444.

Additionally, the first threat level may be based on a speed of the transport, a direction of the transport and a distance between the transport and the person at the first time. The method may also include identifying the person is deviating away from the transport based on one or more of a location of the person at the second time and a position of the person's body at the second time, and responsive to identifying the person is deviating away from the transport, interpreting the gesture by the transport to proceed along the roadway. The process also includes identifying the person is deviating away from entering the roadway based on one or more of a location of the person at the second time and a position of the person's body at the second time, and responsive to identifying the person is deviating away from entering from the roadway, interpreting the gesture by the transport to proceed along the roadway. The process may also include detecting a body movement performed by the person, interpreting the body movement as one or more of instructing the transport to stop and instructing the transport to continue moving on the roadway, and identifying the body movement as the gesture. The process may also include detecting the roadway obstruction in a travel path of the transport via an image capture device of the transport, comparing the detected roadway obstruction to a set of known objects stored in memory, matching the detected roadway obstruction to one or more of the known objects, and responsive to matching the roadway obstruction, designating the roadway obstruction as the person, and the indicating is one or more of a light display, a text indicator, a video indicator, an audio indicator, a wireless data message command, a transport braking operation, and a transport steering operation. The process may also include responsive to determining at least one of the first threat level and the second threat level, invoking a smart contract, creating a blockchain transaction comprising information related to the transport, transport occupants, and at least one of the first threat level and the second threat level, and storing at least one of the smart contract and the blockchain transaction in a distributed ledger.

Figure 4C:
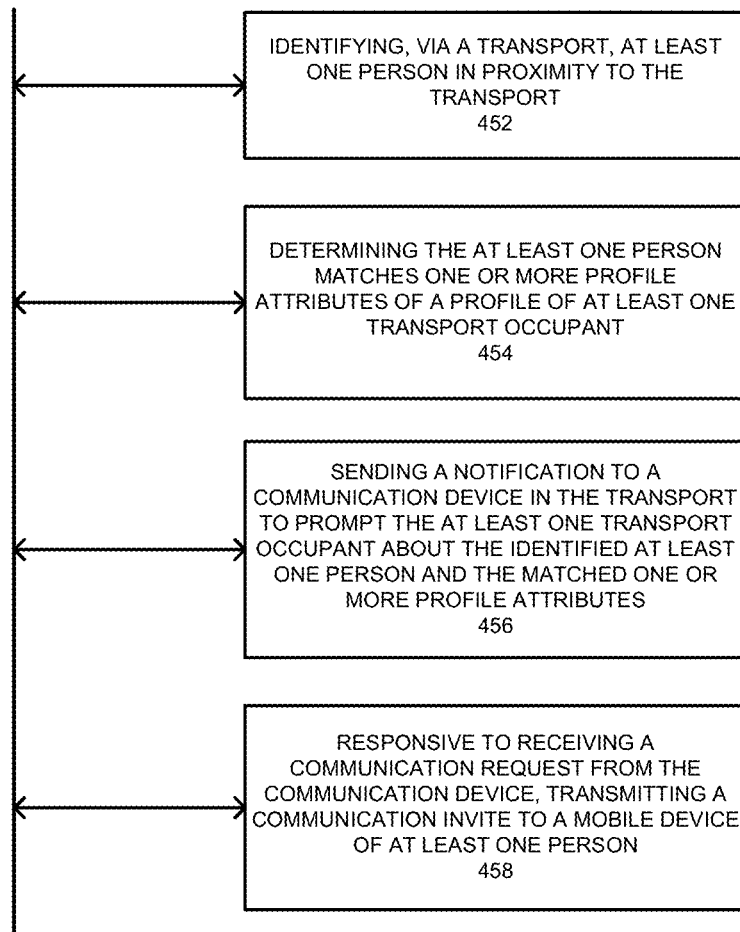
FIG. 4C illustrates a flow diagram of a transport person identification configuration, according to example embodiments.

FIG. 4C illustrates a flow diagram of a transport person identification configuration, according to example embodiments. Referring to FIG. 4C, the process 450 includes identifying, via a transport, at least one person in proximity to the transport 452, determining the at least one person matches one or more profile attributes of a profile of at least one transport occupant 454, sending a notification to a communication device in the transport to prompt the at least one transport occupant about the identified at least one person and the matched one or more profile attributes 456, and responsive to receiving a communication request from the communication device, transmitting a communication invite to a mobile device of the at least one person 458.

The process may also include detecting at least one of a facial recognition of the at least one person and the mobile device operated by the at least one person, and identifying a profile of the at least one person. The process may also include comparing a profile attribute of the at least one person, stored in the profile of the at least one person, to the one or more profile attributes of the at least one transport occupant, and determining the profile of the at least one person is a known contact of the at least one transport occupant, or the profile of the at least one person matches at least one interest of the at least one transport occupant, and the at least one interest is stored in the one or more profile attributes of the at least one transport occupant. The process also include responsive to determining the profile of the at least one person is a known contact of the at least one transport occupant, or, the profile of the at least one person matches at least one interest of the at least one transport occupant, creating a suggested meeting between the at least one transport occupant and the at least one person, and sending a meeting request to the communication device and the mobile device. In one example, the person is located at least one of: adjacent to a roadway currently used by the transport, in another transport traveling within the proximity of the transport, in another transport traveling toward the transport, in another transport traveling to a similar destination of the transport, and at a facility within the proximity of the transport. The process may also include invoking a smart contract responsive to at least one of receiving the communication request from the at least one transport occupant and transmitting the communication invite to the mobile device, and the smart contract includes meeting information for the at least one person and the at least one transport occupant. The process also includes responsive to receiving a communication invite confirmation from the mobile device, creating a blockchain transaction comprising a name of the at least one person, a name of the at least one transport occupant, a date, a time, and the meeting information.

Figure 4D:
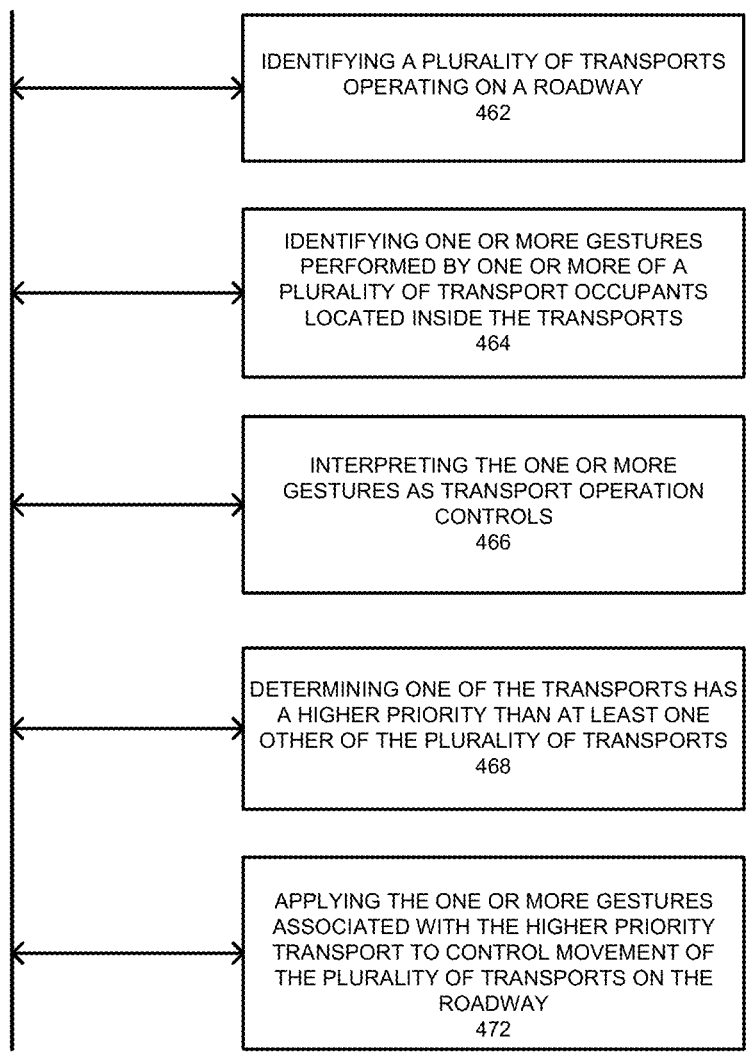
FIG. 4D illustrates a flow diagram of a gesture interpretation and transport management configuration, according to example embodiments.

FIG. 4D illustrates a flow diagram of a gesture interpretation and transport management configuration, according to example embodiments. Referring to FIG. 4D, the process 460 includes identifying a plurality of transports operating on a roadway 462, identifying one or more gestures performed by one or more of a plurality of transport occupants located inside the transports 464, interpreting the one or more gestures as transport operation controls 466, determining one of the transports has a higher priority than at least one other of the plurality of transports 468, and applying the one or more gestures associated with the higher priority transport to control movement of the plurality of transports on the roadway 472.

The process may also include determining one or more of the plurality of transports are operating within a distance of an intersection, and determining a first of the one or more gestures indicates one of the occupants, operating a first transport of the plurality of transports, has instructed another occupant, operating a second transport of the plurality of transports to move the second transport through the intersection, detecting the first gesture via the first transport, matching the first gesture to one or more indicators to be performed by the first transport, performing the one or more indicators via the first transport, and detecting the one or more indicators via the second transport. The process may also include responsive to detecting the one or more indicators via the second transport, moving the second transport through the intersection, detecting the one or more indicators via one or more other transports different from the first and second transports, and responsive to the one or more indicators being detected by the one or more other transports, pausing movement of the one or more other transports for a period of time. In one example, the one or more indicators include at least one of a light display, a text indicator, a video indicator, an audio indicator, a wireless data message command, a transport braking operation, and a transport steering operation. The process also includes invoking a smart contract responsive to applying the one or more gestures associated with the higher priority transport to control movement of one or more of the plurality of transports on the roadway, and creating a blockchain transaction with a date, a time, occupant profiles, and one or more indicators performed by one or more of the plurality of transports.

Figure 4E:
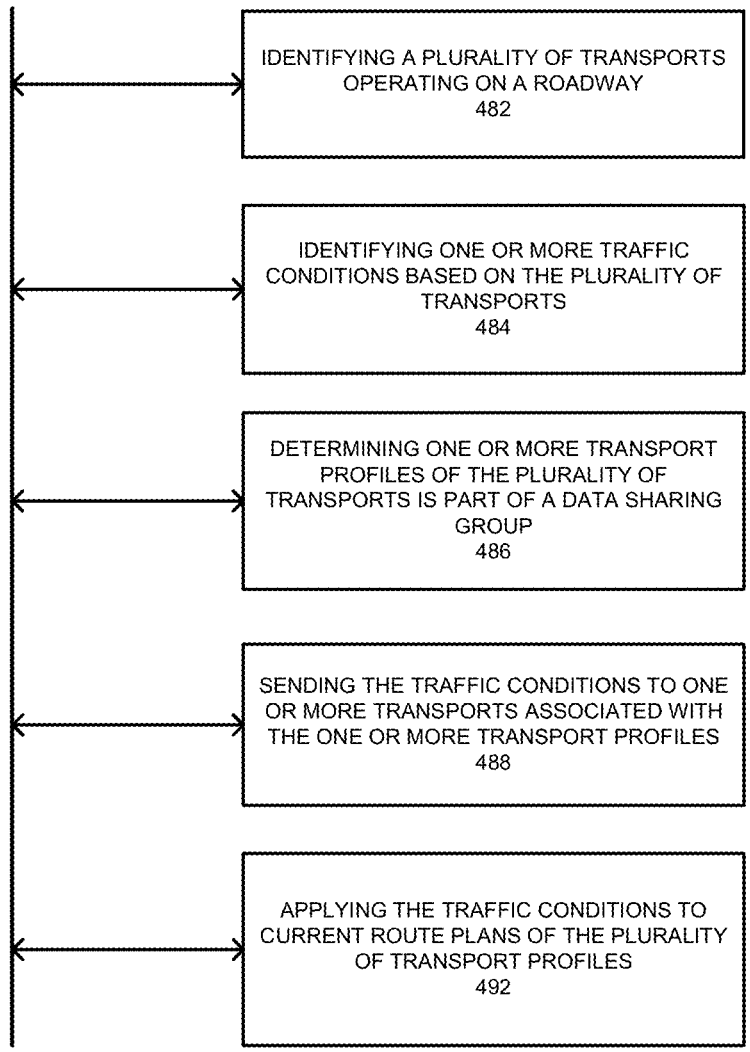
FIG. 4E illustrates a flow diagram of a traffic condition sharing configuration, according to example embodiments.

FIG. 4E illustrates a flow diagram of a traffic condition sharing configuration, according to example embodiments. Referring to FIG. 4E, the process 480 includes identifying a plurality of transports operating on a roadway 482, identifying one or more traffic conditions based on the plurality of transports 484, such as traffic congestion, accidents, preferred routes, new routes, rush hour, etc. The process also includes determining one or more transport profiles of the plurality of transports is part of a data sharing group 486 and sending the traffic conditions to one or more transports associated with the one or more transport profiles 488. The shared information may be updates, alternative routes, different options for traffic routes, etc. The process also includes applying the traffic conditions to current route plans of the plurality of transport profiles 492. In this example, the profiles of transports and/or occupants may be part of a data network of shared information, such as a social network or data sharing group defined by its information topics and members. When any of the members are in a position to identify traffic conditions and related information, the information is identified via sensor data and other information capturing devices and shared with other members of the group for optimal vehicle travel through a particular area.

Figure 5A:
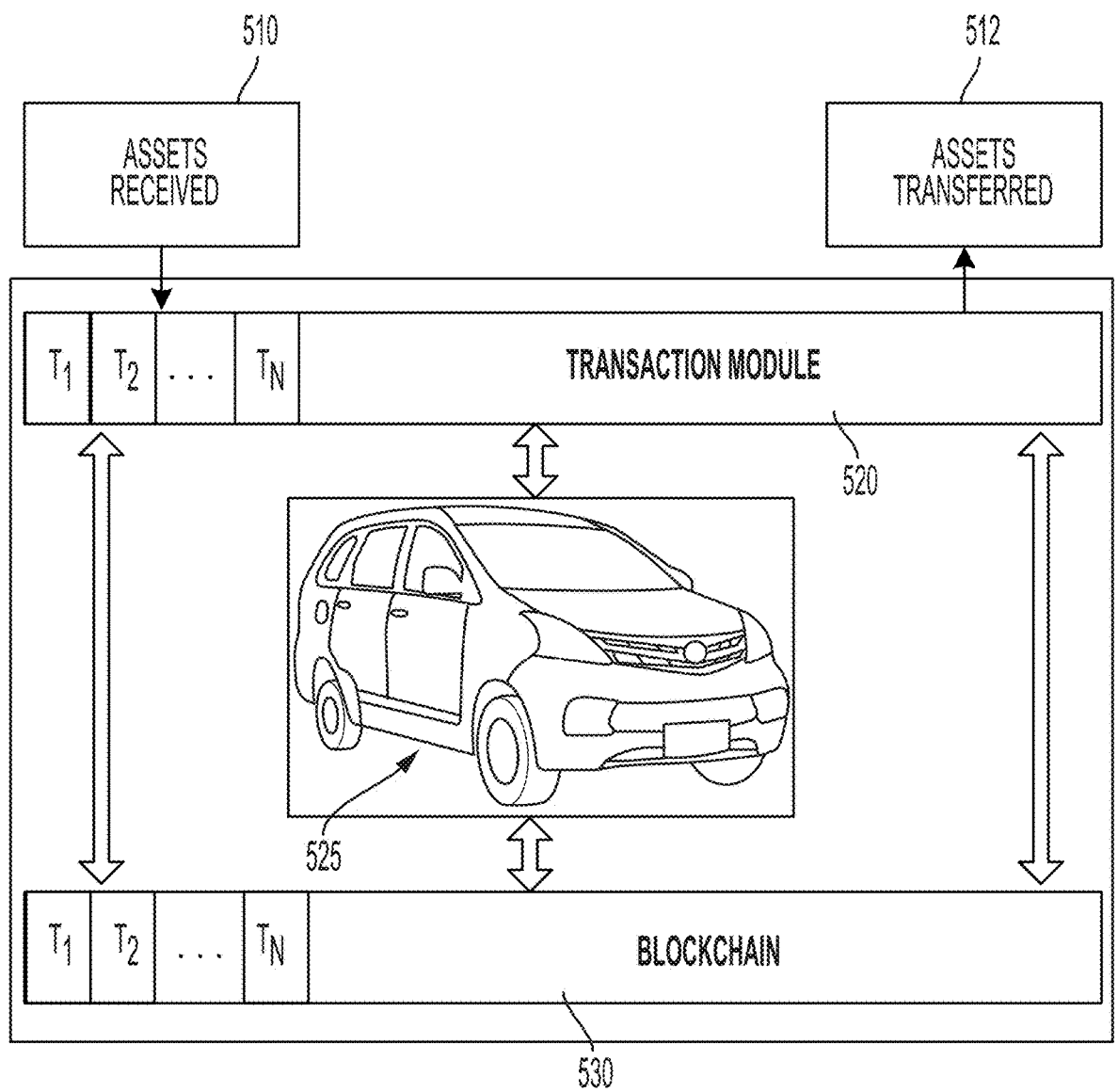
FIG. 5A illustrates a blockchain vehicle configuration for managing blockchain transactions associated with a vehicle, according to example embodiments.

FIG. 5A illustrates an example blockchain vehicle configuration 500 for managing blockchain transactions associated with a vehicle, according to example embodiments. Referring to FIG. 5A, as a particular transport/vehicle 525 is engaged in transactions, such as asset transfer transactions (e.g., access key exchanges, vehicle service, dealer transactions, delivery/pickup, transportation services, etc.). The vehicle 525 may receive assets 510 and/or expel/transfer assets 512 according to a transaction(s) defined by smart contracts. The transaction module 520 may record information, such as parties, credits, service descriptions, date, time, location, results, notifications, unexpected events, etc. Those transactions in the transaction module 520 may be replicated into a blockchain 530, which may be managed by a remote server and/or by a remote blockchain peers, among which the vehicle 525 itself may represent a blockchain member and/or blockchain peer. In other embodiments, the blockchain 530 resides on the vehicle 525. The assets received and/or transferred can be based on location and consensus as described herein.

Figure 5B:
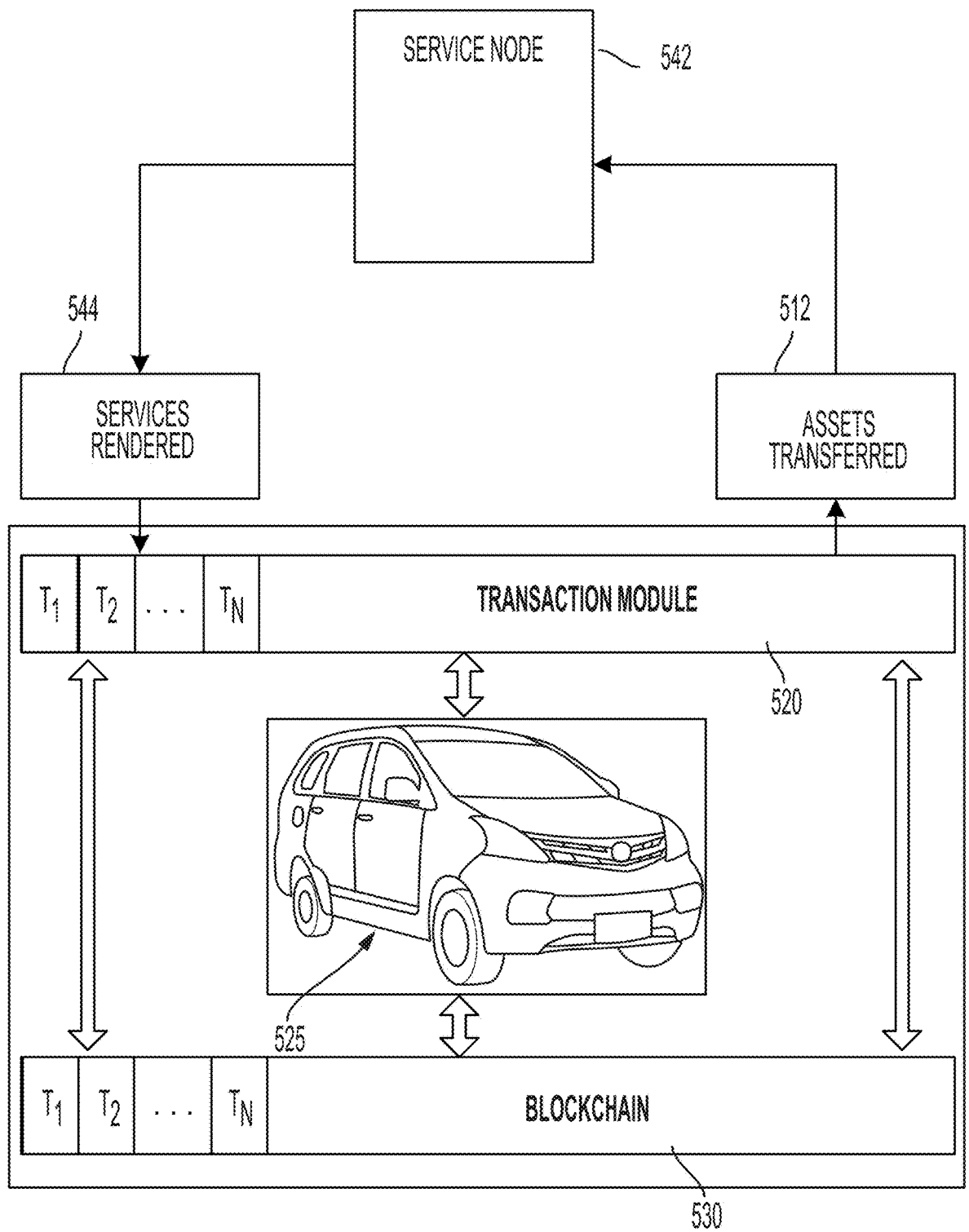
FIG. 5B illustrates another blockchain vehicle configuration for managing blockchain transactions between a service center and a vehicle, according to example embodiments.

FIG. 5B illustrates an example blockchain vehicle configuration 540 for managing blockchain transactions between a service node (e.g., a gas station, a service center, a body shop, a rental center, automotive dealer, local service stop, delivery pickup center, etc.) and a vehicle, according to example embodiments. In this example, the vehicle 525 may have driven itself to a service node 542, because the vehicle needs service and/or needs to stop at a particular location. The service node 542 may perform a service (e.g., pimp gas) or may register the vehicle 525 for a service call at a particular time, with a particular strategy, such as oil change, battery charge or replacement, tire change or replacement, and any other transport related service. The services rendered 544 may be performed based on a smart contract, which is downloaded from or accessed via the blockchain 530 and identified for permission to perform such services for a particular rate of exchange. The services may be logged in the transaction log of the transaction module 520, the credits 512 are transferred to the service center 542 and the blockchain may log transactions to represent all the information regarding the recent service. In other embodiments, the blockchain 530 resides on the vehicle 525 and/or the service center server. In one example, a transport event may require a refuel or other vehicle service and the occupants may then be responsible for the asset value increase for such service. The service may be rendered via a blockchain notification, which is then used to redistribute the asset value to the occupants via their respective asset values. Responsibility for the service center activities can be based on asset transfer as described herein.

Figure 5C:
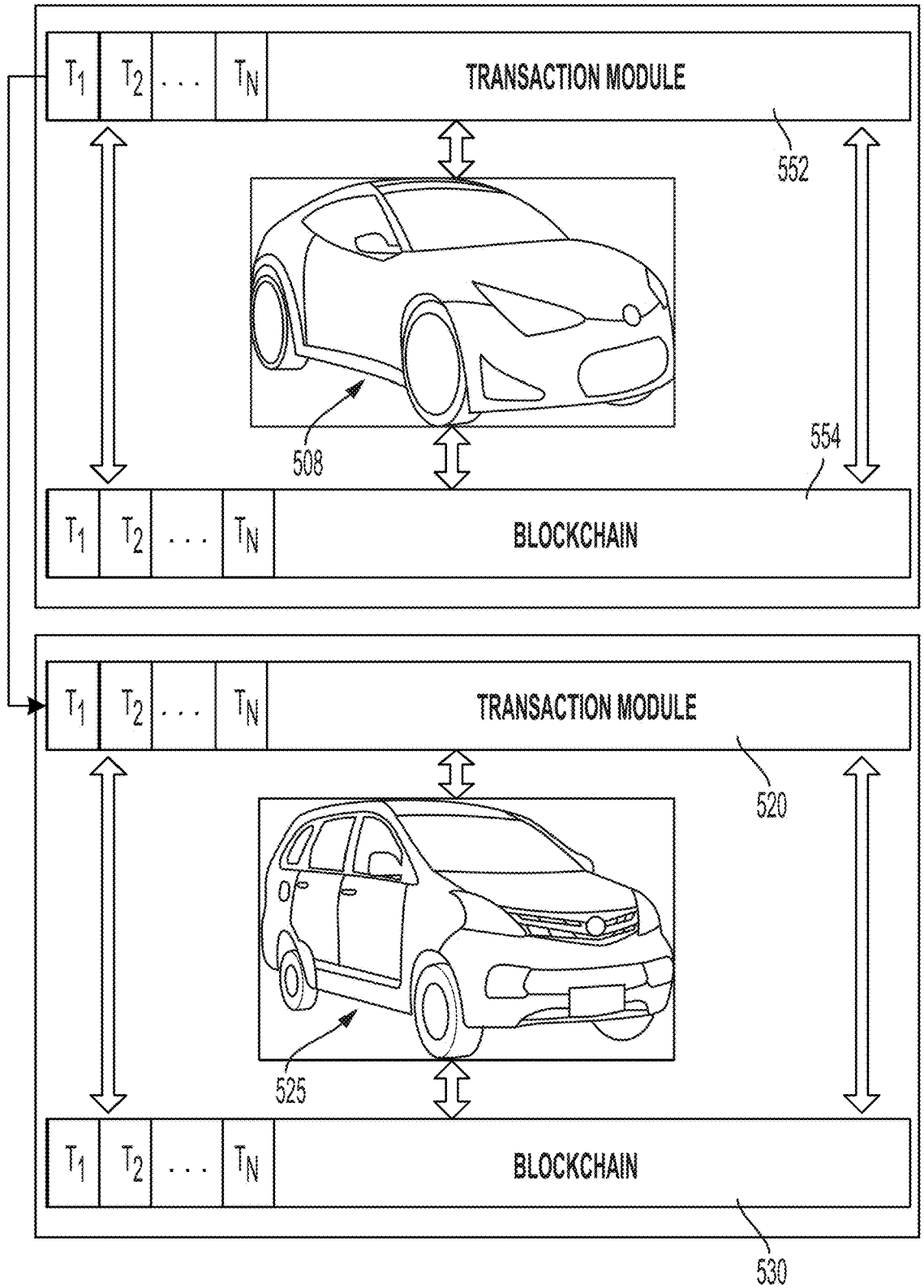
FIG. 5C illustrates yet another blockchain vehicle configuration for managing blockchain transactions conducted among various vehicles, according to example embodiments.

FIG. 5C illustrates an example blockchain vehicle configuration 550 for managing blockchain transactions conducted among various vehicles, according to the exemplary embodiments. The vehicle 525 may engage with another vehicle 508 to perform various actions such as to share access keys, transfer keys, acquire service calls, etc. when the vehicle has reached a status where the assets need to be shared with another vehicle. For example, the vehicle 508 may be due for a battery charge and/or may have an issue with a tire and may be in route to pick up a package for delivery. The vehicle 508 may notify another vehicle 525 which is in its network and which operates on its blockchain member service. The vehicle 525 may then receive the information via a wireless communication request to perform the package pickup from the vehicle 508 and/or from a server (not shown). The transactions are logged in the transaction modules 552 and 520 of both vehicles. The assets are transferred from vehicle 508 to vehicle 525 and the record of the asset transfer is logged in the blockchain 530/554 assuming that the blockchains are different from one another, or, are logged in the same blockchain used by all members. Responsibility for the transferred assets can be based on asset values (e.g., access keys) as described herein.

Figure 6:
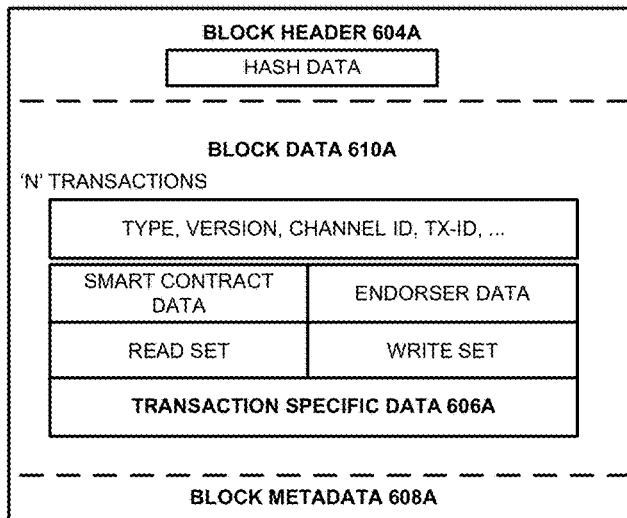
FIG. 6 illustrates example data blocks, according to example embodiments.
Figure 6:
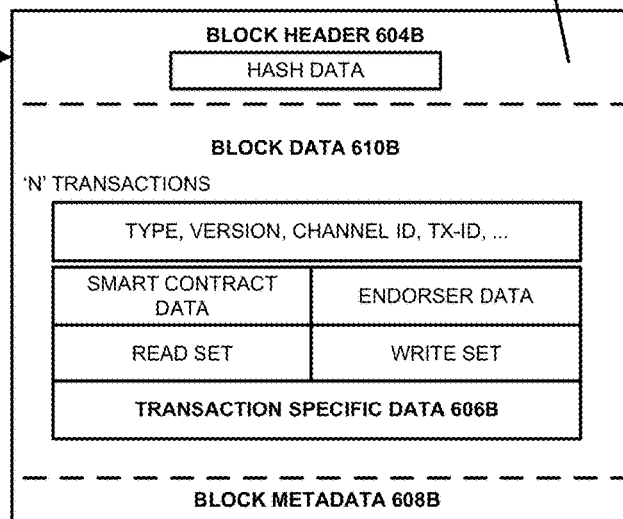
Figure 6:
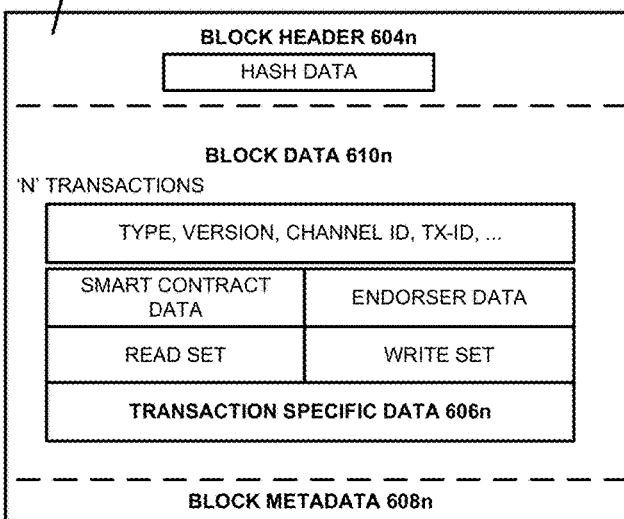

FIG. 6 illustrates blockchain blocks 600 that can be added to a distributed ledger, according to example embodiments, and contents of block structures 602A to 602n. Referring to FIG. 6, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain which stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The method of endorsing an entry depends on an endorsement policy which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 602A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6, a block 602A (also referred to as a data block) that is stored on the blockchain and/or the distributed ledger may include multiple data segments such as a block header 604A to 604n, transaction specific data 606A to 606n, and block metadata 608A to 608n. It should be appreciated that the various depicted blocks and their contents, such as block 602A and its contents are merely for purposes of an example and are not meant to limit the scope of the example embodiments. In some cases, both the block header 604A and the block metadata 608A may be smaller than the transaction specific data 606A which stores entry data; however, this is not a requirement. The block 602A may store transactional information of N entries (e.g., 100, 500, 1000, 2000, 3000, etc.) within the block data 610A to 610n. The block 602A may also include a link to a previous block (e.g., on the blockchain) within the block header 604A. In particular, the block header 604A may include a hash of a previous block's header. The block header 604A may also include a unique block number, a hash of the block data 610A of the current block 602A, and the like. The block number of the block 602A may be unique and assigned in an incremental/sequential order starting from zero. The first block in the blockchain may be referred to as a genesis block which includes information about the blockchain, its members, the data stored therein, etc.

The block data 610A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 610A may also store transaction specific data 606A which adds additional information to the hash-linked chain of blocks in the blockchain. Accordingly, the data 606A can be stored in an immutable log of blocks on the distributed ledger. Some of the benefits of storing such data 606A are reflected in the various embodiments disclosed and depicted herein. The block metadata 608A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 610A and a validation code identifying whether an entry was valid/invalid.

The other blocks 602B to 602n in the blockchain also have headers, files, and values. However, unlike the first block 602A, each of the headers 604A to 604n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 612, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
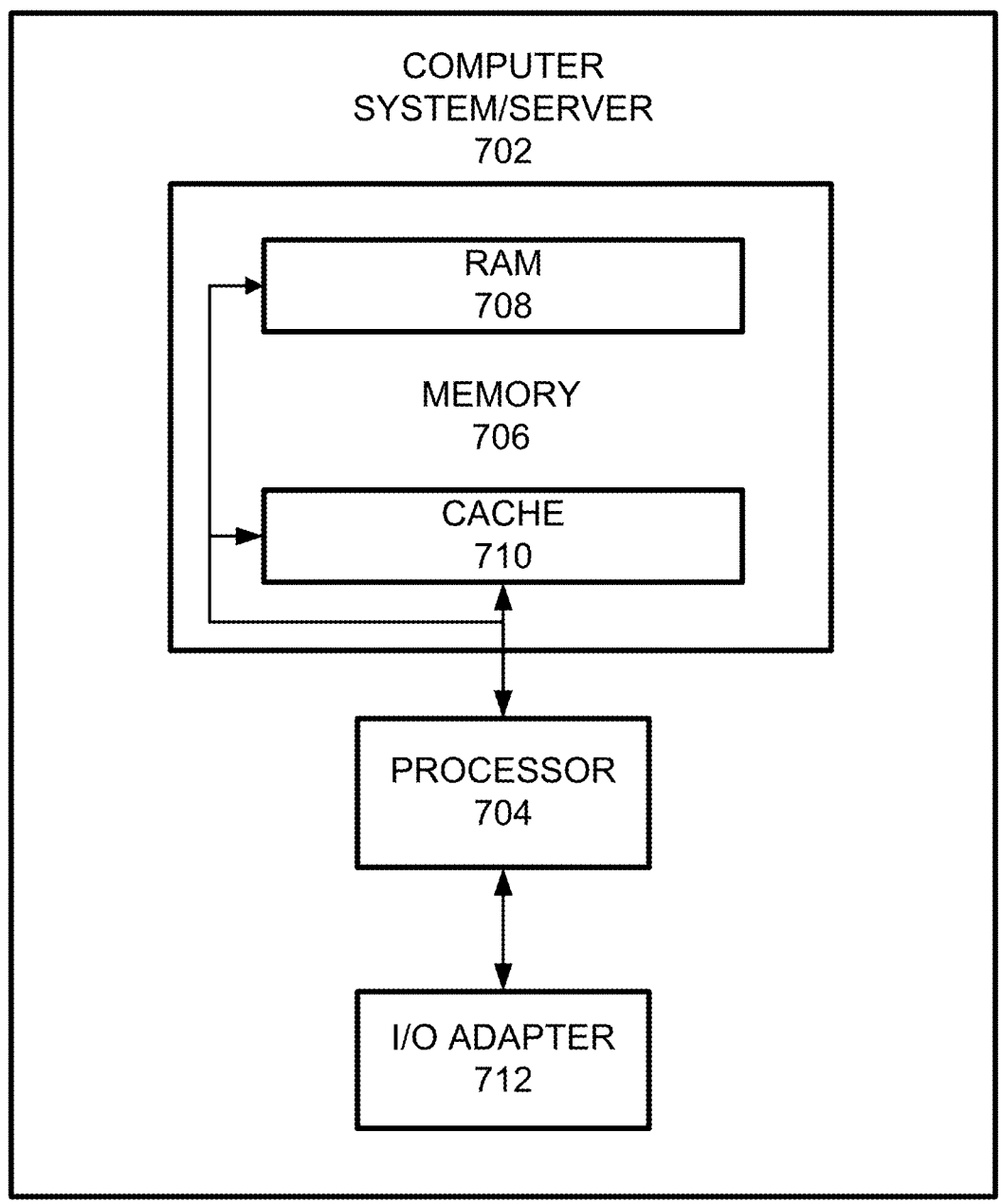
FIG. 7 illustrates an example system that supports one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 708 and/or cache memory 710. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via an I/O adapter 712, such as a keyboard, a pointing device, a display, etc.; one or more devices that enable a user to interact with computer system/server 702; and/or any devices (e.g., network card, modem, etc.) that enable computer system/server 702 to communicate with one or more other computing devices. Such communication can occur via I/O interfaces of the adapter 712. Still yet, computer system/server 702 can communicate with one or more networks such as a local area network (LAN), a general wide area network (WAN), and/or a public network (e.g., the Internet) via a network adapter. As depicted, adapter 712 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
identifying, via a transport, at least one person outside the transport and in proximity to the transport;
determining the at least one person matches one or more profile attributes of a profile of at least one transport occupant;
sending a notification to a communication device in the transport to prompt the at least one transport occupant about the identified at least one person and the matched one or more profile attributes; and
responsive to receiving a communication request from the communication device, transmitting a communication invite to a mobile device of the at least one person;
wherein a meeting request between the at least one transport occupant and the at least one person is sent to the communication device and the mobile device respectively, responsive to the matched one or more profile attributes.

2. The method of claim 1, comprising
detecting at least one of a facial recognition of the at least one person and the mobile device operated by the at least one person; and
identifying the profile of the at least one person.

3. The method of claim 2, comprising:
comparing a profile attribute of the at least one person, stored in the profile of the at least one person, to the one or more profile attributes of the at least one transport occupant; and
determining the profile of the at least one person is a known contact of the at least one transport occupant, or the profile of the at least one person matches at least one interest of the at least one transport occupant, wherein the at least one interest is stored in the one or more profile attributes of the at least one transport occupant.

4. The method of claim 1, wherein the at least one person is located at least one of: adjacent to a roadway currently used by the transport, in another transport traveling within the proximity of the transport, in another transport traveling toward the transport, in another transport traveling to a similar destination of the transport, and at a facility within the proximity of the transport.

5. The method of claim 1, comprising:
invoking a smart contract responsive to at least one of receiving the communication request from the at least one transport occupant and transmitting the communication invite to the mobile device, wherein the smart contract comprises meeting information for the at least one person and the at least one transport occupant.

6. The method of claim 1, comprising:
responsive to receiving a communication invite confirmation from the mobile device, creating a blockchain transaction comprising a name of the at least one person, a name of the at least one transport occupant, a date, a time, and the meeting information.

7. A system, comprising:
a transport; and
a communication device;
wherein the transport is configured to
identify at least one person outside the transport and in proximity to the transport;
determine the at least one person matches one or more profile attributes of a profile of at least one transport occupant;
send a notification to the communication device in the transport to prompt the at least one transport occupant about the identified at least one person and the matched one or more profile attributes; and
responsive to a communication request being received from the communication device, transmit a communication invite to a mobile device of the at least one person;
wherein a meeting request between the at least one transport occupant and the at least one person is sent to the communication device and the mobile device respectively, responsive to the matched one or more profile attributes.

8. The system of claim 7, wherein the transport is further configured to
detect at least one of a facial recognition of the at least one person and the mobile device operated by the at least one person; and
identify the profile of the at least one person.

9. The system of claim 8, wherein the transport is further configured to
compare a profile attribute of the at least one person, stored in the profile of the at least one person, to the one or more profile attributes of the at least one transport occupant; and
determine the profile of the at least one person is a known contact of the at least one transport occupant, or the profile of the at least one person matches at least one interest of the at least one transport occupant, wherein the at least one interest is stored in the one or more profile attributes of the at least one transport occupant.

10. The system of claim 7, wherein the at least one person is located at least one of: adjacent to a roadway currently used by the transport, in another transport traveling within the proximity of the transport, in another transport traveling toward the transport, in another transport traveling to a similar destination of the transport, and at a facility within the proximity of the transport.

11. The system of claim 7, wherein the transport is further configured to invoke a smart contract responsive to at least one of the communication request being received from the at least one transport occupant and the communication invite being transmitted to the mobile device, wherein the smart contract comprises meeting information for the at least one person and the at least one transport occupant.

12. The system of claim 7, wherein the transport is further configured to, responsive to a communication invite confirmation being received from the mobile device, create a blockchain transaction comprising a name of the at least one person, a name of the at least one transport occupant, a date, a time, and the meeting information.

13. A non-transitory computer readable storage medium configured to store instructions that when executed cause a processor to perform:
identifying, via a transport, at least one person outside the transport and in proximity to the transport;
determining the at least one person matches one or more profile attributes of a profile of at least one transport occupant;
sending a notification to a communication device in the transport to prompt the at least one transport occupant about the identified at least one person and the matched one or more profile attributes; and responsive to receiving a communication request from the communication device, transmitting a communication invite to a mobile device of the at least one person;

wherein a meeting request between the at least one transport occupant and the at least one person is sent to the communication device and the mobile device respectively, responsive to the matched one or more profile attributes.

14. The non-transitory computer readable storage medium of claim 13, wherein the processor is further configured to perform:

detecting at least one of a facial recognition of the at least one person and the mobile device operated by the at least one person; and identifying the profile of the at least one person.

15. The non-transitory computer readable storage medium of claim 14, wherein the processor is further configured to perform:

comparing a profile attribute of the at least one person, stored in the profile of the at least one person, to the one or more profile attributes of the at least one transport occupant; and determining the profile of the at least one person is a known contact of the at least one transport occupant, or the profile of the at least one person matches at least one interest of the at least one transport occupant, wherein the at least one interest is stored in the one or more profile attributes of the at least one transport occupant.

16. The non-transitory computer readable storage medium of claim 13, wherein the at least one person is located at least one of: adjacent to a roadway currently used by the transport, in another transport traveling within the proximity of the transport, in another transport traveling toward the transport, in another transport traveling to a similar destination of the transport, and at a facility within the proximity of the transport.

17. The non-transitory computer readable storage medium of claim 13, wherein the processor is further configured to perform:

invoking a smart contract responsive to at least one of receiving the communication request from the at least one transport occupant and transmitting the communication invite to the mobile device, wherein the smart contract comprises meeting information for the at least one person and the at least one transport occupant.

* * * * *